(12) United States Patent
Lainema

(10) Patent No.: US 11,044,467 B2
(45) Date of Patent: Jun. 22, 2021

(54) VIDEO AND IMAGE CODING WITH WIDE-ANGLE INTRA PREDICTION

(71) Applicant: Nokia Technologies Oy, Espoo (FI)

(72) Inventor: Jani Lainema, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/473,785

(22) PCT Filed: Dec. 29, 2017

(86) PCT No.: PCT/FI2017/050950
§ 371 (c)(1),
(2) Date: Jun. 26, 2019

(87) PCT Pub. No.: WO2018/127624
PCT Pub. Date: Jul. 12, 2018

(65) Prior Publication Data
US 2019/0356909 A1    Nov. 21, 2019

(30) Foreign Application Priority Data

Jan. 3, 2017 (FI) ...................................... 20175006

(51) Int. Cl.
*H04N 19/105* (2014.01)
*H04N 19/11* (2014.01)
(Continued)

(52) U.S. Cl.
CPC .......... *H04N 19/105* (2014.11); *H04N 19/11* (2014.11); *H04N 19/147* (2014.11);
(Continued)

(58) Field of Classification Search
CPC .. B60H 1/00571; H04N 19/105; H04N 19/11; H04N 19/119; H04N 19/147;
(Continued)

(56) References Cited

U.S. PATENT DOCUMENTS

2005/0276323 A1   12/2005   Martemyanov et al.
2007/0110304 A1*  5/2007    Tsukada ............... H04N 1/6033
                                                            382/167
(Continued)

FOREIGN PATENT DOCUMENTS

JP          2013-524670 A     6/2013
WO     WO 2011/126157 A1     10/2011

OTHER PUBLICATIONS

"Video Coding for Low Bit Rate Communication", Series H: Audiovisual and Multimedia Systems Infrastructure of audiovisual services—Coding of moving video, ITU-T Recommendation H.263, Jan. 2005, 226 pages.

(Continued)

*Primary Examiner* — Md N Haque
(74) *Attorney, Agent, or Firm* — Alston & Bird LLP

(57) ABSTRACT

The invention relates to a method for decoding, comprising receiving a bitstream comprising encoded image data, forming from the bitstream in a computer memory a set of reference pixels having reference pixel values for intra-picture directional prediction, predicting a pixel value in a predicted image block (P) by intra-picture directional prediction by using values of one or more selected reference pixels (410, 420) in forming a predicted a pixel value, wherein the selected reference pixels (410, 420) are selected from a prediction direction with respect to the predicted pixel, and wherein the prediction direction between the reference pixel (410) and the predicted pixel can be a wide-angle prediction direction that forms an obtuse angle with top-left direction, repeating the pixel prediction for a number of pixels to form a predicted image block, and using the predicted image block (P) in decoding an image block from the bitstream to obtain a decoded image block. A corresponding method for decoding as well as a decoder, an (Continued)

encoder, computer program products for the same purpose, and a signal are provided.

14 Claims, 11 Drawing Sheets

(51) Int. Cl.
   *H04N 19/147* (2014.01)
   *H04N 19/159* (2014.01)
   *H04N 19/176* (2014.01)
   *H04N 19/182* (2014.01)

(52) U.S. Cl.
   CPC ......... *H04N 19/159* (2014.11); *H04N 19/176* (2014.11); *H04N 19/182* (2014.11)

(58) Field of Classification Search
   CPC .. H04N 19/159; H04N 19/176; H04N 19/182; H04N 19/19; H04N 19/30; H04N 19/593
   See application file for complete search history.

(56) References Cited

U.S. PATENT DOCUMENTS

| | | | | |
|---|---|---|---|---|
| 2008/0247464 | A1* | 10/2008 | Seregin | H04N 19/593 |
| | | | | 375/240.12 |
| 2010/0118943 | A1* | 5/2010 | Shiodera | H04N 19/61 |
| | | | | 375/240.12 |
| 2010/0135389 | A1 | 6/2010 | Tanizawa et al. | |
| 2011/0249731 | A1* | 10/2011 | Zhao | H04N 19/152 |
| | | | | 375/240.12 |
| 2013/0136175 | A1* | 5/2013 | Wang | H04N 19/11 |
| | | | | 375/240.12 |
| 2013/0301715 | A1 | 11/2013 | Lin et al. | |
| 2013/0307773 | A1* | 11/2013 | Yagishita | G06F 3/0425 |
| | | | | 345/158 |
| 2014/0286400 | A1* | 9/2014 | Joshi | H04N 19/593 |
| | | | | 375/240.03 |
| 2015/0245021 | A1* | 8/2015 | Matsuo | H04N 19/147 |
| | | | | 375/240.02 |
| 2015/0365692 | A1 | 12/2015 | Liu et al. | |
| 2017/0374369 | A1 | 12/2017 | Chuang et al. | |
| 2019/0075328 | A1 | 3/2019 | Huang et al. | |
| 2019/0158846 | A1* | 5/2019 | Moon | H04N 19/176 |

OTHER PUBLICATIONS

"Advanced Video Coding for Generic Audiovisual Services", Series H: Audiovisual and Multimedia Systems, Infrastructure of audiovisual services—Coding of moving video, Recommendation ITU-T H.264, Oct. 2016, 801 pages.

"High Efficiency Video Coding", Series H: Audiovisual and Multimedia Systems Infrastructure of audiovisual services—Coding of moving video, Recommendation ITU-T H.265, Apr. 2015, 634 pages.

Seregin et al., "Block Shape Dependent Intra Mode Coding", Joint Video Exploration Team (JVET) of ITU-T SG16 WP3 and ISO/IEC JTC1/SC29/WG11, JVET-D1001, 4th Meeting, Oct. 15-21, 2016, pp. 1-3.

Office action received for corresponding Finnish Patent Application No. 20175006, dated Jun. 15, 2017, 10 pages.

International Search Report and Written Opinion received for corresponding Patent Cooperation Treaty Application No. PCT/FI2017/050950, dated Apr. 25, 2018, 16 pages.

Zhang et al., "Wyner-Ziv Video Coding using Progressive Encoding and Decoding", Visual Communications and Image Processing (VCIP), Nov. 6-9, 2011, 4 pages.

Office action received for corresponding Vietnam Patent Application No. 1-2019-03342, dated Sep. 13, 2019, 1 page of office action and 1 page of office action translation available.

Office Action for Korean Application No. 2019-7022716 dated Jul. 3, 2020, 15 pages.

Extended European Search Report for Application No. EP 17890511.3 dated Jul. 24, 2020, 8 pages.

Lainema, J. et al., *Intra Coding of the HEVC Standard*, IEEE Transactions on Circuits and System for Video Technology, vol. 22, No. 12 (Dec. 1, 2012) 1792-1801.

Wang, S. et al., *Overview of the Second Generation AVS Video Coding Standard (AVS2)*, ZTE Communications, vol. 14, No. 2 (Feb. 2, 2016) 3-11.

Chen, J. et al., *Algorithm Description of Joint Exploration Test Model 4 (JEM4)*, JVET-D1001, ISO/IEC JTC1/SC29/WG11/N16511, JVET) (Oct. 2016) 39 pages.

Office Action for Canadian Application No. 3,048,115 dated Aug. 3, 2020, 5 pages.

Office Action for Japanese Application No. 2019-535877 dated Sep. 9, 2020, 11 pages.

Office Action for Japanese Application No. 2019-535877 dated Nov. 25, 2020, 7 pages, including English translation.

Office Action for Korean Application No. 2019-7022716 dated Dec. 19, 2020, with English translation, 9 pages.

Seregin et al., "Block Shape Dependent Intra Mode Coding", Joint Video Exploration Team (JVET) of ITU-T SG16 WP3 and ISO/IEC JTC1/SC29/WG11, JVET-D0114, 4th Meeting, Chengdu, CN, Oct. 15-21, 2016, pp. 1-3.

First Examination Report for Indian Application No. 201947024185 dated Feb. 25, 2021, 7 pages.

Office Action for Japanese Application No. 2016-535877 dated Apr. 7, 2021, 6 pages.

* cited by examiner

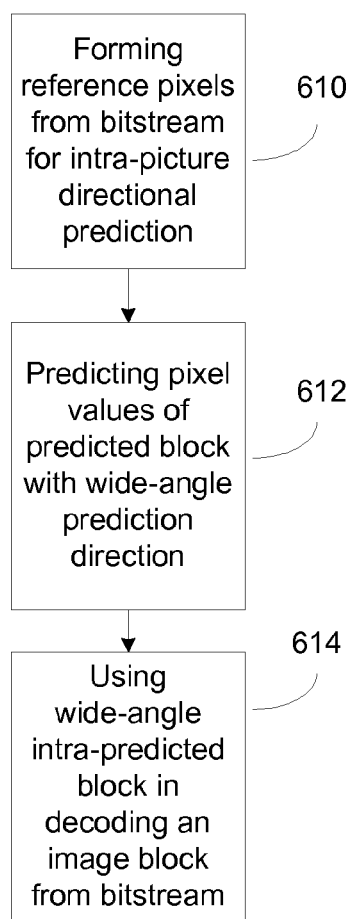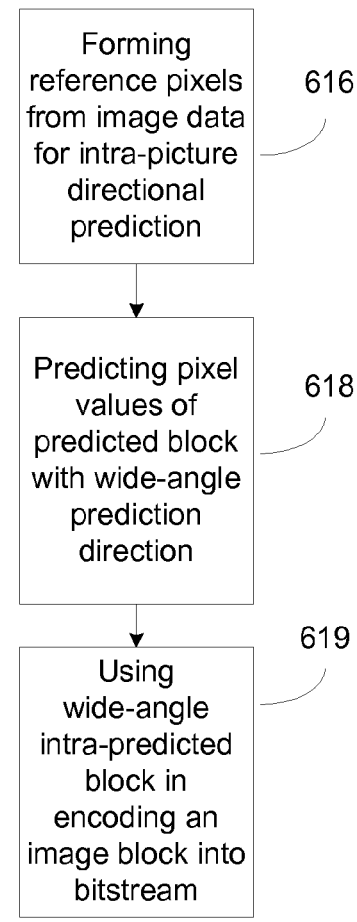
Fig. 6a
Fig. 6b

VIDEO AND IMAGE CODING WITH WIDE-ANGLE INTRA PREDICTION

RELATED APPLICATION

This application was originally filed as PCT Application No. PCT/FI2017/050950 filed Dec. 29, 2017 which claims priority benefit from FI Patent Application No. 20175006 filed Jan. 3, 2017.

TECHNICAL FIELD

The various embodiments described in this application relate to directional intra prediction based image and/or video coding. In different aspects, methods, apparatuses, systems and computer program products for using directional intra prediction in image and video coding are described, as well as a signal or data structure for the same.

BACKGROUND

This section is intended to provide a background or context to the invention that is recited in the claims. The description herein may include concepts that could be pursued, but are not necessarily ones that have been previously conceived or pursued.

Therefore, unless otherwise indicated herein, what is described in this section is not prior art to the description and claims in this application and is not admitted to be prior art by inclusion in this section.

Directional intra prediction generates blocks of predicted samples (i.e. values of pixels) based on decoded samples around the block by extrapolating the border samples directionally inside the block to be predicted. This predicted block may be used as a basis for encoding the image block, and the prediction error between the predicted block and the original block may be encoded instead of encoding the original block directly. Generally, the better the prediction, the more efficient is the encoding of the image. Intra coded images are typically the largest coded images, compared e.g. to inter coded images.

There is, therefore, a need for solutions that improve the directional intra prediction based coding of images and video.

SUMMARY

Now there has been invented an improved method and technical equipment implementing the method, by which the above problems are alleviated. Various aspects of the invention include a method, an apparatus, a server, a client and a computer readable medium comprising a computer program stored therein, which are characterized by what is stated in the independent claims. Various embodiments of the invention are disclosed in the dependent claims.

Methods, apparatuses, systems, computer program products and signals for intra-picture directional prediction with wide-angle prediction directions are provided here. By wide angle it is meant that the direction from where the reference to a pixel to be predicted is taken forms an obtuse angle with the top-left direction (the direction in the middle of directions "up" and "left"). Such wide-angle prediction mode (i.e. direction) may be encoded directly to the bitstream as a selected mode. The wide-angle directions at use, their number and the exact directions, and their probability may be determined by the shape of the block to be predicted. The wide-angle modes may correspond to traditional narrow-angle modes by being their flip modes. Such flip modes may be opposite, essentially opposite, or at-an-angle but somewhat opposite to the primary narrow-angle modes. It may be chosen which one of the primary and wide-angle modes to use.

According to a first aspect, there is provided a method for decoding, comprising receiving a bitstream comprising encoded image data, forming from the bitstream in a computer memory a set of reference pixels having reference pixel values for intra-picture directional prediction, predicting a pixel value in a predicted image block by intra-picture directional prediction by using values of one or more selected reference pixels in forming a predicted pixel value, wherein the selected reference pixels are selected from a prediction direction with respect to the predicted pixel, and the prediction direction being a wide-angle prediction direction that forms an obtuse angle with top-left direction of the predicted pixel, repeating the pixel prediction for a number of pixels to form a predicted image block, and using the predicted image block in decoding an image block from the bitstream to obtain a decoded image block.

The predicted image block may have a shape. The method may comprise determining the shape from the bitstream. The method may comprise determining directional prediction modes to be used in the intra-picture directional prediction based on the shape, in predicting the pixel value, selecting the prediction direction from the directional prediction modes. The method may comprise determining prediction modes to be used in the intra-picture directional prediction, determining probable prediction modes based on the shape, decoding an indicator from the bitstream indicating whether the prediction direction is one of the probable prediction modes, and selecting the prediction direction from the probable prediction modes. The method may comprise determining directional prediction modes to be used in the intra-picture directional prediction, decoding a direction indicator from the bitstream, selecting the prediction direction for the predicting the pixel value from a primary direction and a wide-angle direction, the primary direction and a wide-angle direction being associated with the direction indicator. The method may comprise decoding a prediction direction selection indicator from the bitstream, and selecting the prediction direction for the predicting the pixel value from the normal direction and the wide-angle direction using the prediction direction selection indicator. The method may comprise selecting the prediction direction for the predicting the pixel value from a primary direction and a wide-angle direction based on the shape. The primary direction may be associated with the wide-angle direction such that the primary direction and the wide-angle direction are essentially opposite directions. The primary direction may be associated with the wide-angle direction such that the primary direction and the wide-angle direction are other than essentially opposite directions and that the primary direction and the wide-angle direction are on opposite sides of the top-left direction. There may be more than one wide angle directions associated with one primary direction, or more than one primary direction has the same associated wide angle direction, or both. The method may comprise determining prediction modes to be used in the intra-picture directional prediction, decoding a direction indicator from the bitstream, forming a predicted prediction direction for the predicting the pixel value between a normal direction and a wide-angle direction using the shape, the normal direction and a wide-angle direction being associated with the direction indicator, and selecting the prediction direction based on the predicted prediction direction.

According to a second aspect there is provided a method for encoding, comprising receiving image data to be encoded, forming from the image data in a computer memory a set of reference pixels having reference pixel values for intra-picture directional prediction, predicting a pixel value in a predicted image block by intra-picture directional prediction by using values of one or more selected reference pixels in forming a predicted a pixel value, wherein the selected reference pixels are selected from a prediction direction with respect to the predicted pixel, and the prediction direction being a wide-angle prediction direction that forms an obtuse angle with top-left direction of the predicted pixel, repeating the pixel prediction for a number of pixels to form a predicted image block, using the predicted image block in encoding an image block into a bitstream. The method for encoding may comprise similar features to the method for decoding as part of the encoding method as described in the numbered examples.

According to a third aspect there is provided a decoder that is arranged to carry out the method for decoding as described in the numbered examples.

According to a fourth aspect there is provided an encoder that is arranged to carry out the method for encoding as described in the numbered examples.

According to a fifth aspect, there is provided a system for decoding as described in the numbered examples.

According to a sixth aspect, there is provided a system for encoding as described in the numbered examples.

According to a seventh aspect, there is provided a computer program product for decoding as described in the numbered examples.

According to an eighth aspect, there is provided a computer program product for encoding as described in the numbered examples.

According to a ninth aspect, there is provided a signal embodied on a non-transitory computer readable medium as described in the numbered examples.

DESCRIPTION OF THE DRAWINGS

In the following, various embodiments of the invention will be described in more detail with reference to the appended drawings, in which

FIGS. 6a, 6b, 6c and 6d show flow diagrams of encoding and decoding employing wide angle directional intra prediction.

DESCRIPTION OF EXAMPLE EMBODIMENTS

In the following, several embodiments of the invention will be described in the context of video encoding and decoding. It is to be noted, however, that the invention is not limited to video encoding and decoding, but may be used in still image encoding and decoding, and conversion (transcoding) between image and video formats. In fact, the different embodiments have applications in any environment where directional intra prediction for image or video encoding or decoding is required.

Figure 1A:
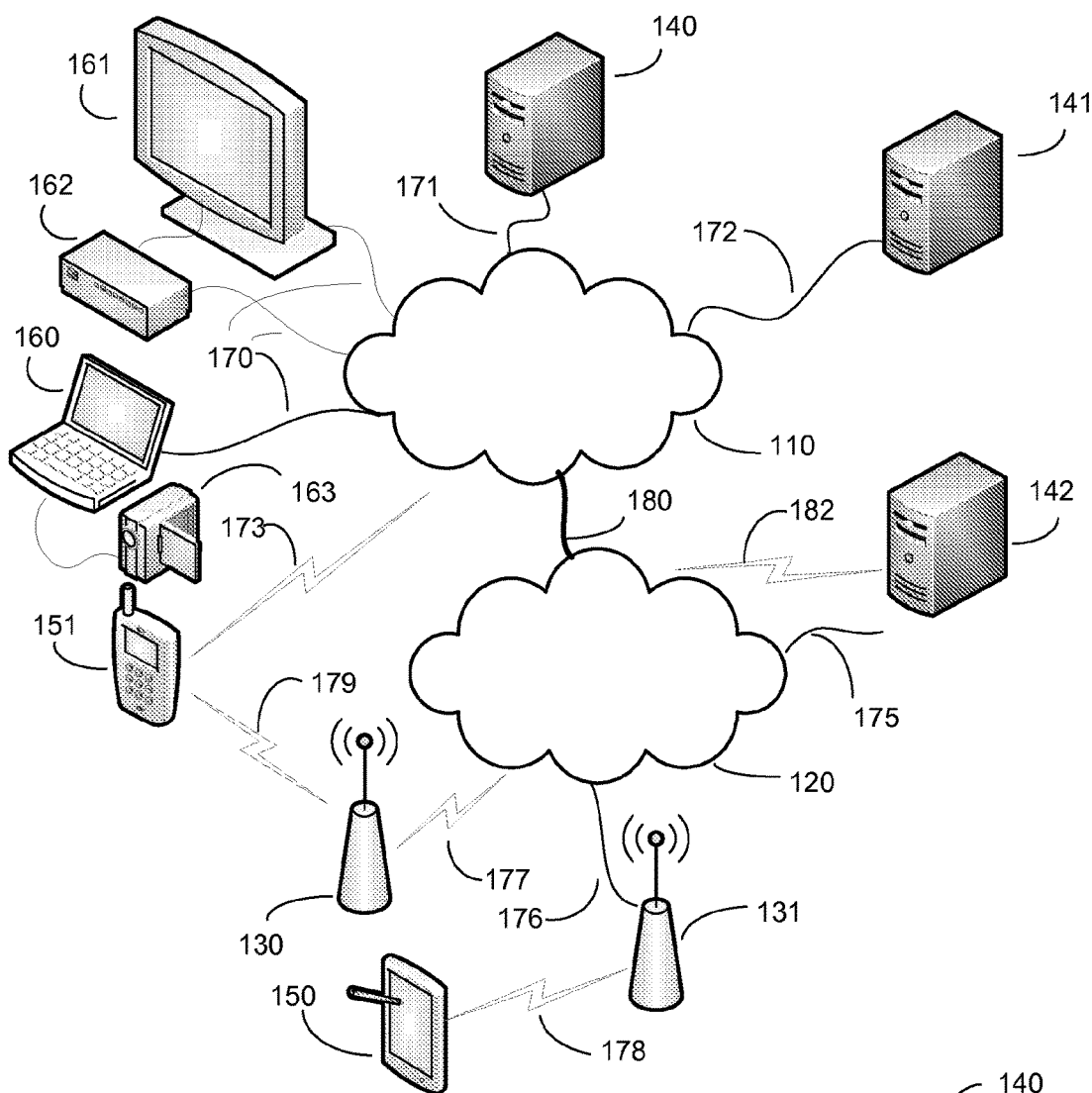
FIGS. 1a and 1b show a system and devices for image or video encoding and decoding.
Figure 1B:
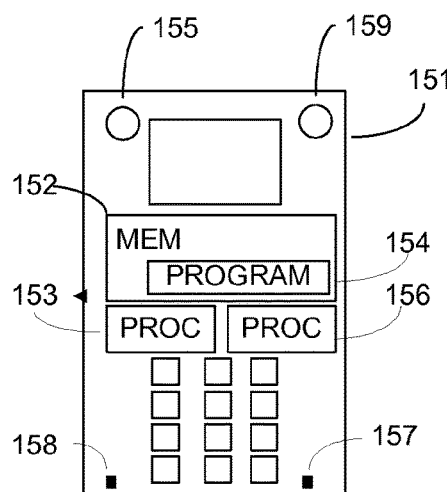
Figure 1B:
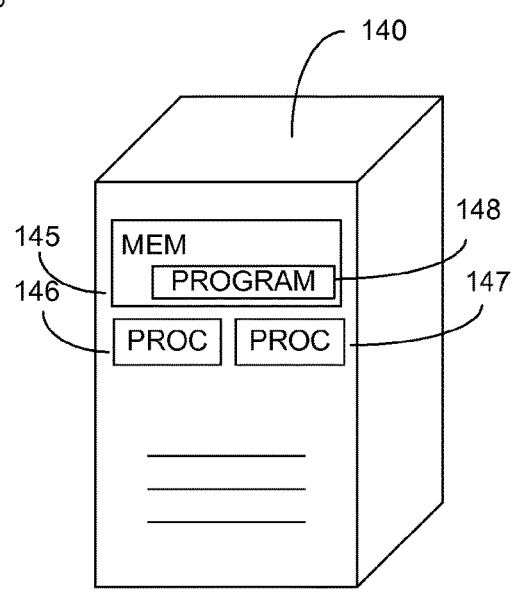

FIGS. 1a and 1b show system and devices for image and/or video coding and/or transmission according to examples. In FIG. 1a, the different devices may be connected via a fixed network 110 such as the Internet or a local area network; or a mobile communication network 120 such as the Global System for Mobile communications (GSM) network, 3rd Generation (3G) network, 3.5th Generation (3.5G) network, 4th Generation (4G) network, 5th Generation (5G) network, Wireless Local Area Network (WLAN), Bluetooth®, or other contemporary and future networks. Different networks are connected to each other by means of a communication interface 180. The networks comprise network elements such as routers and switches to handle data, and communication interfaces such as the base stations 130 and 131 in order for providing access for the different devices to the network, and the base stations 130, 131 are themselves connected to the mobile network 120 via a fixed connection 176 or a wireless connection 177.

There may be a number of servers connected to the network, and in the example of FIG. 1a are shown a server 140 for offering a network service for image or video access or streaming and connected to the fixed network 110, a server 141 for processing (e.g. encoding or transcoding) image/video data and connected to the fixed network 110, and a server 142 for offering a network service e.g. an image/video sharing service and connected to the mobile network 120. Some of the above devices, for example the computers 140, 141, 142 may be such that they make up the Internet with the communication elements residing in the fixed or wireless network 110.

There are also a number of end-user devices such as mobile phones and smart phones 151, Internet access devices (Internet tablets) 150, personal computers 160 of various sizes and formats, televisions and other viewing devices 161, video decoders and players 162, as well as video cameras 163 and other encoders. These devices 150, 151, 160, 161, 162 and 163 can also be made of multiple parts. The various devices may be connected to the networks 110 and 120 via communication connections such as a fixed connection 170, 171, 172 and 180 to the internet, a wireless connection 173 to the internet 110, a fixed connection 175 to the mobile network 120, and a wireless connection 178, 179 and 182 to the mobile network 120. The connections 171-182 are implemented by means of communication interfaces at the respective ends of the communication connection. The various devices may create, transform, send, receive, decode and display images and video according to examples given here.

FIG. 1b shows devices for encoding and decoding (as well as transcoding, that is, decoding and encoding in a different format) image or video data. As shown in FIG. 1b, the server 140 contains memory 145, one or more processors 146, 147, and computer program code 148 residing in the memory 145 for implementing, for example, encoding and/or decoding functionality. The different servers 141, 142 may contain at least these same elements for employing functionality relevant to each server. Similarly, the end-user device 151 contains memory 152, at least one processor 153 and 156, and computer program code 154 residing in the memory 152 for implementing, for example, encoding or decoding of image data from the device camera. The end-user device may have one or more cameras 155 and 159 for capturing image data, for example a video stream comprising a number of frames, or still images. The end-user device may also contain one, two or more microphones 157 and 158 for capturing sound. The different end-user devices 150, 160 may contain at least these same elements for employing functionality relevant to each device. The end user devices may also comprise a screen for viewing a graphical user interface. The end-user devices and servers may also comprise various communication modules or communication functionalities implemented in one module for communicating with other devices.

The various end-user devices and servers may take the form of communication devices, or other devices having communication capability. For example, the devices may be toys, home appliances like kitchen machines, entertainment devices (TV, music/media devices), or even parts of the building, clothes, vehicles, or any other devices that may communicate with each other.

It needs to be understood that different embodiments allow different parts to be carried out in different elements. For example, receiving and transforming image data (images or video) may be carried out entirely in one user device like 150, 151 or 160, or in one server device 140, 141, or 142, or across multiple user devices 150, 151, 160 or across multiple network devices 140, 141, 142, or across both user devices 150, 151, 160 and network devices 140, 141, 142. For example, the image data (images or video) may be formed and stored in one device, the encoding of the image data may happen in another device and the decoding may be carried out in a third device (e.g. a server). The relevant software for carrying out the functionality may reside on one device or distributed across several devices, as mentioned above, for example so that the devices form a so-called cloud.

The different embodiments may be implemented as software running on mobile devices and optionally on servers. The mobile phones may be equipped at least with a memory, processor, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use. The devices may have various communication modules for communicating with other devices.

A video codec consists of an encoder that transforms the input video into a compressed representation suited for storage/transmission and a decoder that can uncompress the compressed video representation back into a viewable form. Typically encoder discards some information in the original video sequence in order to represent the video in a more compact form (that is, at a lower bitrate).

Typical hybrid video codecs, for example ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discreet Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Figure 2A:
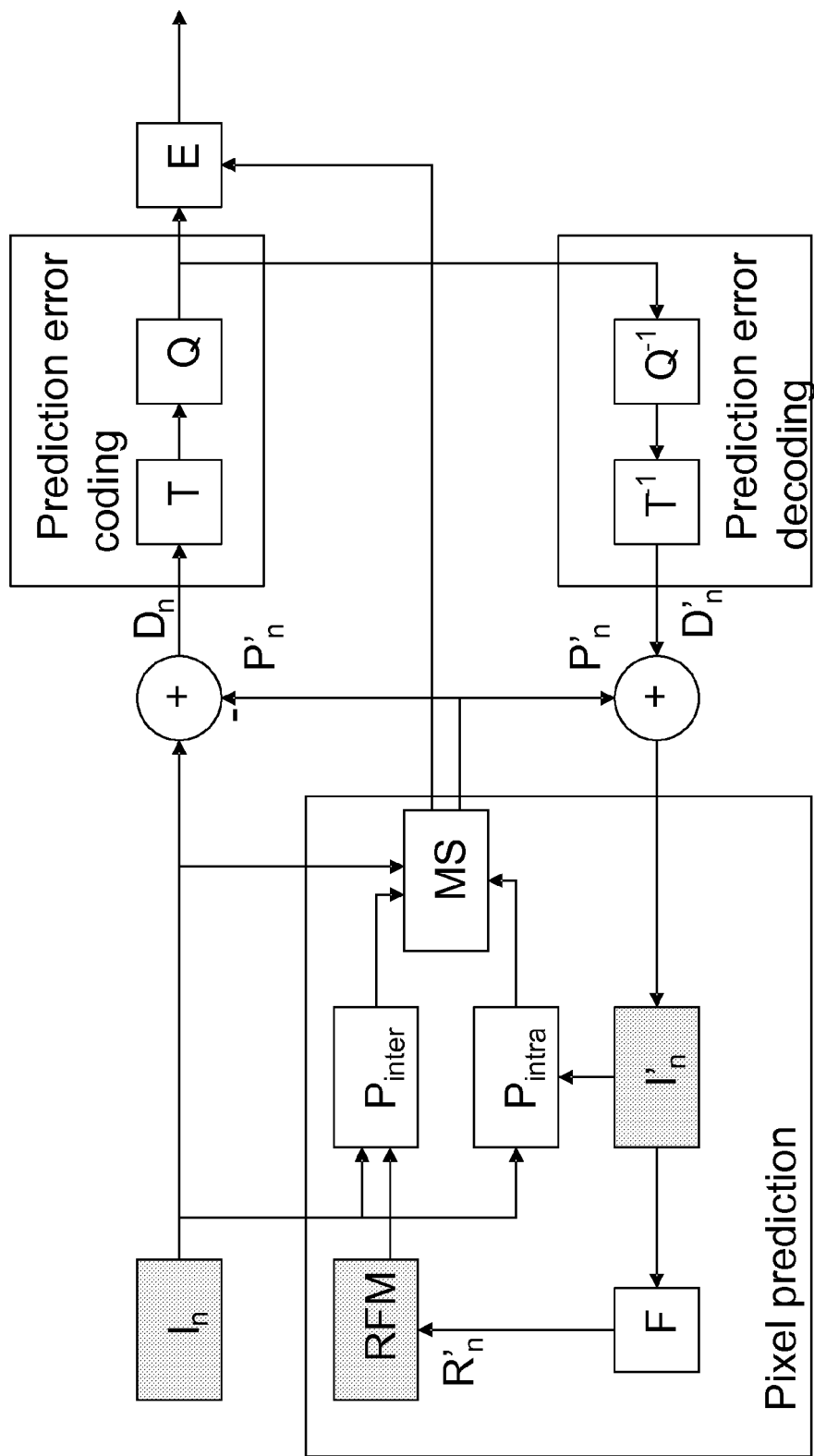
FIGS. 2a and 2b show a block diagram of an encoder and a decoder.

The encoder and the encoding method it performs is illustrated in FIG. 2a. In FIG. 2a, the image to be encoded $I_n$ is an input to the encoder. The input image can be a still image or a frame of a video signal. A predicted representation of an image block $P'_n$ is formed so that it can be subtracted from the incoming image data to get a prediction error signal $D_n$. The prediction error signal is coded using a transform T and quantization Q. A reconstructed prediction error signal $D'_n$ is obtained through inverse quantization $Q^{-1}$ and inverse transform $T^{-1}$ and used to form a preliminary reconstructed image $I'_n$. A predicted representation of an image block $P'_n$ may be obtained through either an intra prediction $P_{intra}$ or inter prediction Pinter depending on the mode (mode selection MS). In inter prediction, filtering F and reference frame memory RFM are used to store the final reconstructed image $R'_n$ as needed. The images in the reference frame memory correspond to the images ultimately obtained by the decoder as a result of the decoding process. The transformed and quantized prediction error and the mode selection and other coding parameters are entropy encoded by the entropy encoder E. The resulting bitstream can be stored or transmitted, and subsequently decoded by a decoder.

An encoder as in FIG. 2a may comprise a decoder that decodes the encoded image data so that the decoded image data can be used in the prediction processes. The decoded image data is stored in a buffer, e.g. a reference picture buffer. When the encoder encodes the incoming video data by using prediction, the buffered decoded data is used from the buffer. The encoder may also use the incoming video data as a basis for prediction for faster operation, but such an approach introduces encoding error due to the fact that the decoder uses encoded and decoded video data as a prediction basis, which is different from the incoming video data used by the encoder.

In some video codecs, such as HEVC [1], video pictures are divided into coding units (CU) covering the area of the picture. A CU consists of one or more prediction units (PU) defining the prediction process for the samples within the CU and one or more transform units (TU) defining the prediction error coding process for the samples in the said CU. A CU typically consists of a square or rectangular block of samples with a size selectable from a predefined set of possible CU sizes. A CU with the maximum allowed size is typically named as LCU (largest coding unit) or CTU (coding tree unit) and the video picture is divided into non-overlapping CTUs. A CTU can be further split into a combination of smaller CUs, e.g. by recursively splitting the CTU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the said TU (including e.g. DCT coefficient information). It is typically signaled at CU level whether prediction error coding is applied or not for each CU. In the case there is no prediction error residual associated with the CU, it can be considered there are no TUs for the said CU. The division of the image into CUs, and division of CUs into PUs and TUs is typically signaled in the bitstream allowing the decoder to reproduce the intended structure of these units.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. In case of encoding one or more still images, the output may be called an image bitstream, and in case of encoding video, the output may be called a video bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

Figure 2B:
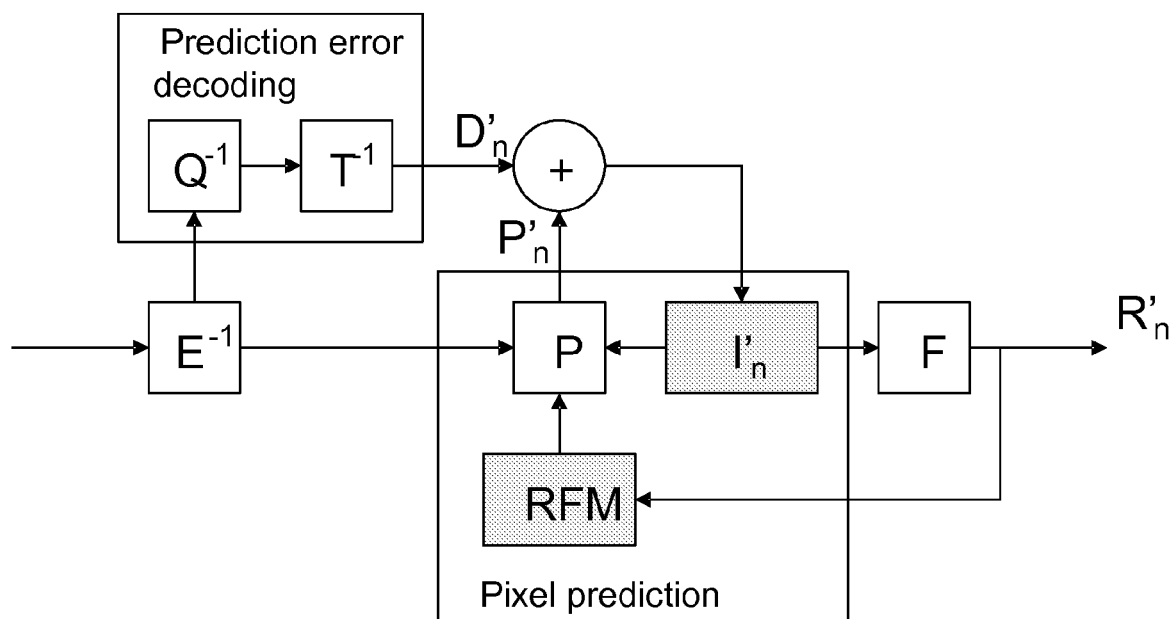

The decoder and the decoding method it carried out is illustrated in FIG. 2b. In FIG. 2b, an incoming bitstream is decoded by an entropy decoder $E^{-1}$ to obtain a prediction error signal and the decoding mode information. The prediction error is decoded by inverse quantization $Q^{-1}$ and an inverse transform $T^{-1}$ to obtain a reconstructed prediction error signal $D'_n$. Depending on the mode, the pixel prediction employs either intra or inter prediction P to obtain a predicted representation of an image block $P'_n$. A reference frame memory RFM is used to store earlier decoded pictures. From the reconstructed prediction error signal $D'_n$ and the predicted representation of an image block $P'_n$, a preliminary reconstructed image $I'_n$ is obtained. This preliminary reconstructed image $I'_n$ can be used in intra prediction, and to obtain a final reconstructed image $R'_n$ through filtering F. The output final reconstructed image $R'_n$ may be stored in the reference picture memory RFM, and may be displayed to the user.

The elementary unit for the input to an H.264/AVC and H.265 encoder and the output of an H.264/AVC and H.265 decoder, respectively, is a picture. A picture may either be a frame or a field. A frame comprises a matrix of luma samples and corresponding chroma samples. A field is a set of alternate sample rows of a frame and may be used as encoder input, when the source signal is interlaced. In H.264/AVC and H.265, a macroblock is a 16×16 block of luma samples and the corresponding blocks of chroma samples. For example, in the 4:2:0 sampling pattern, a macroblock contains one 8×8 block of chroma samples per each chroma component. In H.264/AVC and H.265, a picture is partitioned to one or more slice groups, and a slice group contains one or more slices. In H.264/AVC and H.265, a slice consists of an integer number of blocks.

Instead, or in addition to approaches utilizing sample value prediction and transform coding for indicating the coded sample values, a color palette based coding can be used. Palette based coding refers to a family of approaches for which a palette, i.e. a set of colors and associated indexes, is defined and the value for each sample within a coding unit is expressed by indicating its index in the palette. Palette based coding can achieve good coding efficiency in coding units with a relatively small number of colors (such as image areas which are representing computer screen content, like text or simple graphics). In order to improve the coding efficiency of palette coding different kinds of palette index prediction approaches can be utilized, or the palette indexes can be run-length coded to be able to represent larger homogenous image areas efficiently. Also, in the case the CU contains sample values that are not recurring within the CU, escape coding can be utilized. Escape coded samples are transmitted without referring to any of the palette indexes. Instead their values are indicated individually for each escape coded sample.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Typically video codecs support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

In typical video codecs the prediction residual after motion compensation or intra prediction is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor A to tie together the (exact or estimated) image distortion due to lossy coding methods and the (exact or estimated) amount of information that is required to represent the pixel values in an image area:

$$C=D+\lambda R, \quad (Eq. 1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use typically with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

In addition to quality scalability, the following scalability modes exist:

Spatial scalability: Base layer pictures are coded at a lower resolution than enhancement layer pictures.

Bit-depth scalability: Base layer pictures are coded at lower bit-depth (e.g. 8 bits) than enhancement layer pictures (e.g. 10 or 12 bits).

Chroma format scalability: Enhancement layer pictures provide higher fidelity in chroma (e.g. coded in 4:4:4 chroma format) than base layer pictures (e.g. 4:2:0 format).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame based scalability, approach can be implemented very efficiently with minimal changes to single layer codecs while still achieving majority of the coding efficiency gains available. Essentially a reference frame based scalability codec can be implemented by utilizing the same hardware or software implementation for all the layers, just taking care of the DPB management by external means.

In order to be able to utilize parallel processing, images can be split into independently codable and decodable image segments (slices or tiles). Slices typically refer to image segments constructed of certain number of basic coding units that are processed in default coding or decoding order, while tiles typically refer to image segments that have been defined as rectangular image regions that are processed at least to some extend as individual frames.

In traditional directional intra prediction the set of available directions are limited to the range of −45 to +45 degrees from above the block and −45 to +45 degrees from left of the block. This 180 degree range extending from the top-right diagonal to the bottom-left diagonal serves well for traditional square intra prediction blocks. For example, H.264/AVC and H.265/HEVC video coding standards use traditional spatial intra prediction with square prediction blocks and intra prediction directions ranging from −45 to +45 degrees from above the block and −45 to +45 degrees from left of the block.

Figure 3A:
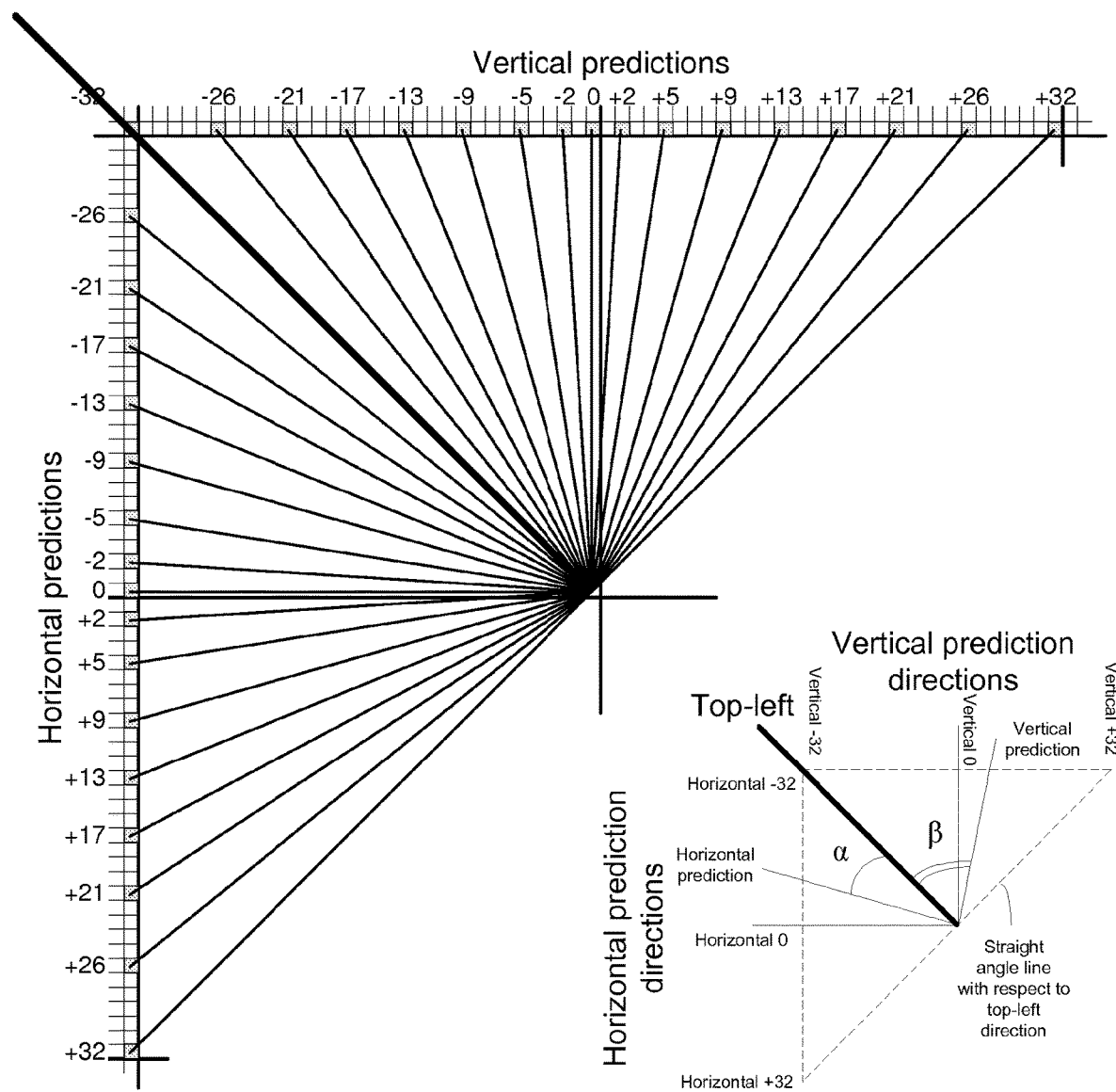
FIGS. 3a, 3b, 3c and 3d illustrate directional intra prediction of an image.

FIG. 3a depicts the set of intra prediction directions used in the H.265/HEVC video coding standard. The numerical values for horizontal prediction from the left boundary and vertical prediction from the top boundary range from −32 to +32 and define the projection difference per sample distance at 1/32 sample accuracy. In other words, the reference pixel or pixels to be used for directional intra prediction can be determined from the horizontal or vertical distance from the boundary that is used for prediction and the intra prediction direction that is used. For example, a value of +32 corresponds to +32/32 reference location deviation for each sample unit between the predicted sample and the reference sample (that is, using +45 degree prediction angle). As another example, a value of −17 in horizontal prediction means that a pixel that is 4 pixels away from the (vertical)

boundary has a reference location of −68/32 with respect to the pixel to be predicted. This means that the reference pixel location is between the $2^{nd}$ and $3^{rd}$ pixel up from the level where the pixel to be predicted resides, and the value of the predicted pixel can be obtained as a weighted average of the $2^{nd}$ and $3^{rd}$ pixel values as $(28*a_2+4*a_3)/32$. Generally, the intra prediction direction is used to determine the reference pixel or pixels for the prediction. The reference pixel or pixels are then used to determine the predicted pixel value, e.g. by a weighted average of the reference pixel values. Pixels immediately neighboring the block boundary (or the extension of the block boundary) can be used as reference pixels. Instead or in addition, pixels further away from the block boundary can be used.

Figure 3B:
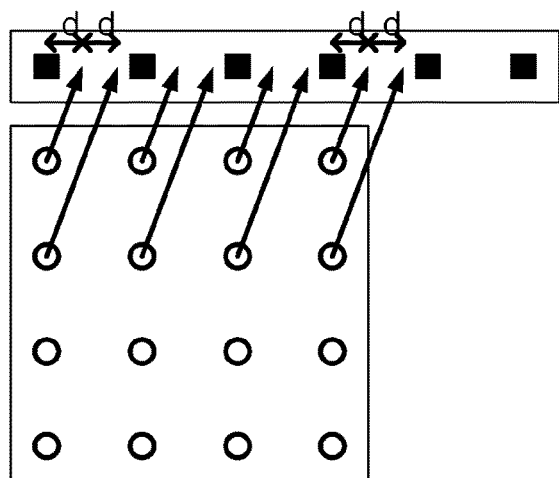

FIG. 3b illustrates an approach where each sample within a prediction block utilizes the same prediction direction in the prediction process. In FIG. 3b, the round pixels represent a block of prediction samples and black squares represent a line of reference samples. Further, FIG. 3b shows prediction projections for first and second row of samples with a fixed prediction direction. As explained above, the offset from the reference sample directly on top is calculated such that for the first line of the prediction samples, the offset is d, for the second line, the offset is 2d and so on.

Figure 3C:
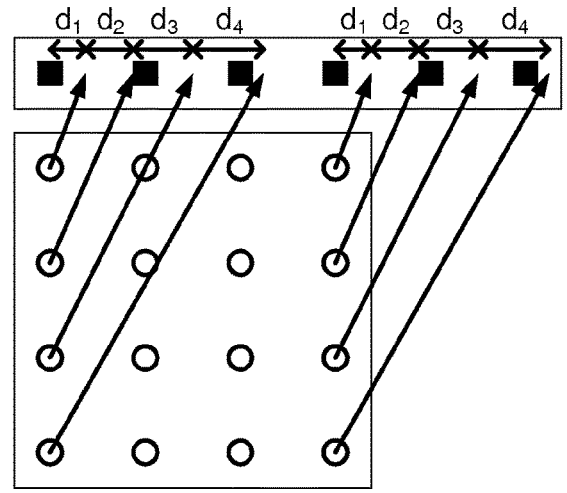

FIG. 3c illustrates applying an intra prediction direction that changes depending on the to-be-predicted sample row's distance from the reference row. In FIG. 3c, the prediction projections are evaluated based on the vertical distance from the reference samples. The offsets for the first, second, third and fourth rows are $d_1$, $d_1+d_2$, $d_1+d_2+d_3$ and $d_1+d_2+d_3+d_4$, where the offset increases $d_1$, $d_2$, $d_3$ and $d_4$ are different in size, for example increasing or decreasing in size. In other words, the prediction direction inside the block to be predicted may change. For example, the prediction direction of the first row to be predicted may be given, and the prediction directions of other rows may be calculated from that first prediction direction.

Figure 3D:
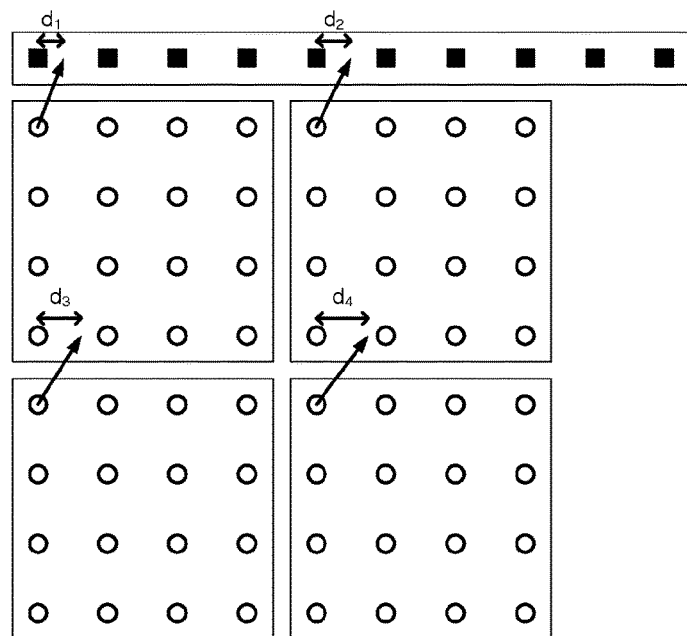

FIG. 3d illustrates the same approach applied at block level. Each 4×4 prediction block of predicted pixel values has a distinct prediction direction that has been calculated based on location of the block. Blocks on the first row of blocks can use reference samples above the blocks, while the blocks below the first row of blocks may use samples within the blocks immediately above them as references for prediction. Each of the block will have their individual prediction direction that has been determined based on each block's position relative to each other (or relative to a defined origin). The prediction direction may thus change from block to block, and the offsets for the first rows of pixels to be predicted are here $d_1$, $d_2$, $d_3$ and $d_4$.

As explained earlier, a weighted average may be used to obtain the predicted pixel values from reference pixel values. In addition to one row of reference pixels, more than one row of reference pixels may be used. The aim of the prediction process may be understood to provide a consistent, smooth predicted block such that the remaining prediction error signal may be coded efficiently. The encoder may in fact try to encode the block with different prediction directions and select the prediction direction that provides the best coding efficiency.

The available directional prediction directions, also called directional prediction modes, can be understood to form a set of directional prediction modes. For example, the set of directional intra prediction directions or directional intra prediction modes used in the H.265/HEVC video coding standard are −32, −26, −21, −17, −13, −9, −5, −2, 0, +2, +5, +9, +13, +17, +21, +26 and +32 for the horizontal prediction and −32, −26, −21, −17, −13, −9, −5, −2, 0, +2, +5, +9, +13, +17, +21, +26 and +32 for the vertical prediction. The direction −32 coincides for the horizontal and vertical prediction directions. The direction +32 in horizontal prediction is exactly opposite to the +32 vertical prediction direction in FIG. 3a. Other sets of prediction directions can also be used. For example, the Joint Exploration Test model 4 (JEM4) supports rectangular (square and non-square) prediction blocks with intra prediction directions with the same range of angles as H.265/HEVC, but introduces more prediction directions in between the H.265/HEVC directions.

As shown in FIG. 3a, the top-left direction for the prediction can be understood to be the 45-degree direction from the center of a square block to be predicted to the top-left corner of the block. A top-left direction can be more generally understood to be the 45-degree direction towards top-left between the horizontal (left) and vertical (up) direction. This top-left direction can be used as a reference, and for example all the prediction directions in FIG. 3a form a zero angle, acute angle (less than 90 degrees) or straight angle (90 degrees) with this top-left direction. In FIG. 3a, an angle α shows a horizontal prediction direction (prediction from reference samples to the left of the block) and an angle β shows a vertical prediction direction (prediction from reference samples above the block). The dashed lines in FIG. 3a indicate the horizontal and vertical boundary or extension of the boundary, as well as the straight angle (90 degrees) line with respect to the top-left direction. The numbers in the small diagram correspond with the numbers of the large diagram for prediction directions. Diagrams according to the notation of the smaller diagram are used in later figures, as well.

However, in the case of non-square blocks, especially if the ratio between the horizontal and vertical dimensions of the prediction block is large, it has been noticed here that this selection of prediction directions in FIG. 3a can be suboptimal. In the case of non-square prediction blocks some of the traditional intra prediction modes e.g. of FIG. 3a with directionality between 0 and +45 degrees (between direct vertical and 45 degree prediction from top-right or direct horizontal and 45 degree prediction from bottom-left direction) may have a large number of active reference samples not directly connected with any of the borders of the block. It has been noticed that in these cases a prediction sample block with similar directional structure but higher correlation between predicted and original samples may be generated by "flipping" or rotating the prediction direction by 180 degrees and using the reference samples on another border of the block (top border instead of left border or left border instead of top border).

Effectively this leads into using a prediction direction set that extends beyond the traditional −45 to +45 to angle range with respect to vertical and horizontal prediction, that is, beyond −90 to 90 degrees from the top-left direction. In order to further enhance coding efficiency provided by the new intra prediction directions it is also described here how these wide angle intra prediction directions can be signaled in the bitstream or combined together to create bi-predicted intra blocks.

Provided here is a video/image coder with a set of intra prediction directions extending beyond the traditional 45 degree angles from horizontal or vertical direction, in other words, to obtuse angles from top-left direction (wide angle prediction). The available prediction modes (directions) may be selected based on the shape of the prediction unit, for example where the steep angles from the narrower direction of the prediction unit are flipped to use the wide-angle prediction direction. The mode information indicating first the general directionality of the block may be coded in the bitstream (this can be used for predicting directionality of the subsequent prediction units). The general prediction directionality may be followed by a check whether two opposite directions of that directionality are both available as prediction modes, and an indication which of the two opposite directions to use if the check indicated both are available. The primary and wide-angle directions may have different probability based on the shape or dimensions of the block.

Figure 4A:
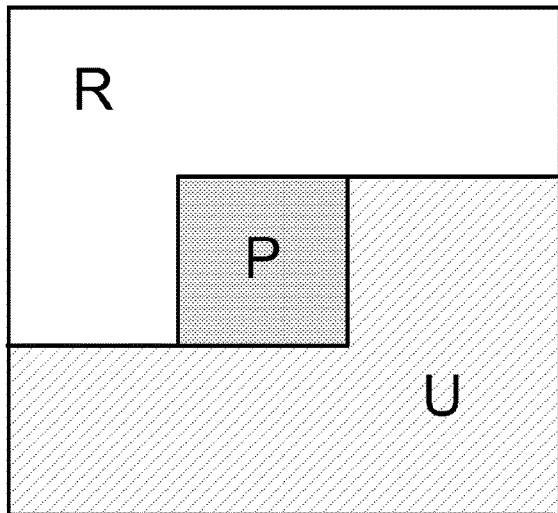
FIGS. 4a, 4b, 4c and 4d illustrate wide angle directional intra prediction of an image.

In the following, wide-angle prediction, that is, prediction by using reference samples in obtuse angle with respect to the top-left direction from a pixel to be predicted, is described. FIG. 4a illustrates an image with block to be predicted P, already reconstructed area R that can be used as reference for prediction process and unavailable area U which has not yet been processed.

Figure 4B:
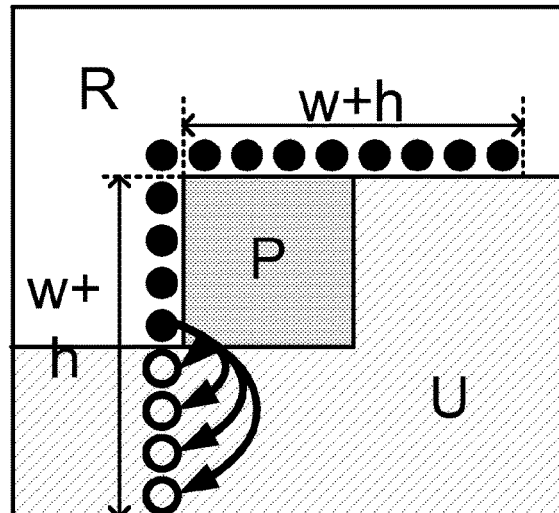

FIG. 4b shows reference samples on the left and top boundary of the block. The already decoded reference samples are illustrated with solid circles. Unavailable reference samples are illustrated with empty circles. Such unavailable reference samples have not yet been decoded/processed, or they may be beyond the image edge. Such unavailable reference samples may be obtained by padding with the closest available reference sample on the same boundary, that is, copying the value from an available reference sample such as the closest available reference sample. The number of needed reference samples in either horizontal and vertical direction is w+h+1 if the prediction directions are within the straight angle from the top-left direction. This is because in the vertical prediction, the largest offset from the directly-on-top is equal to the height h of the block (with 45-degree top-right prediction direction), and the width of the block is w, and the horizontal prediction follows the same logic. The top-left corner pixel is always needed.

Figure 4C:
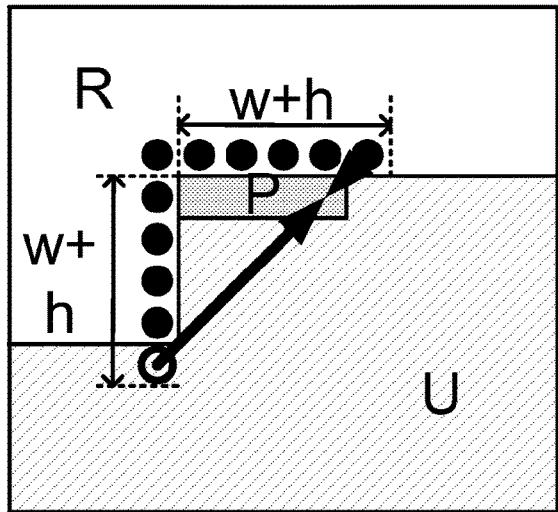

FIG. 4c illustrates a non-square prediction block, and shows the horizontal +45 degree prediction for the rightmost sample of the block (long arrow) and vertical +45 degree prediction for the rightmost sample of the block (short arrow). As can be seen, there is only one unavailable reference pixel (the lowest).

Figure 4D:
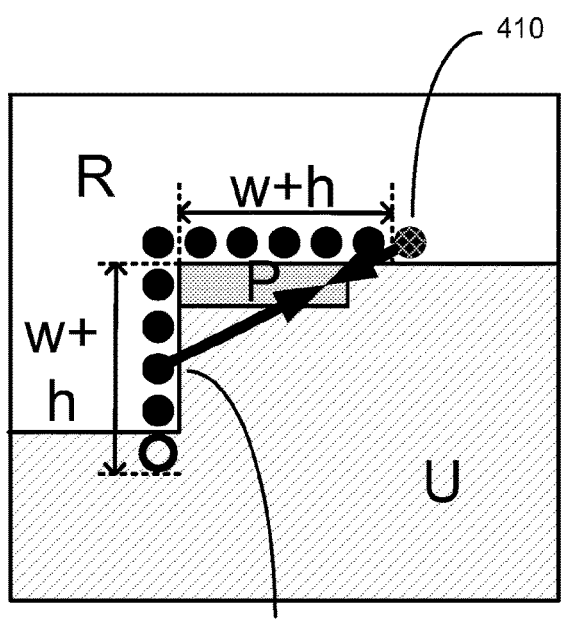

FIG. 4d shows a non-square prediction block, and a horizontal prediction with angularity between 0 and +45 degrees (long arrow), that is, having an acute angle with the top-left direction, and its flip mode (wide-angle mode) with vertical angularity larger than +45 degrees (short arrow), that is, having an obtuse angle with the top-left direction. As can be seen, an additional reference sample 410 (or more than one additional reference samples, marked with patterned black fill) is used on the top row to enable prediction from the wide-angle direction (short arrow). In such a wide-angle i.e. obtuse-angle directional intra prediction, for a rectangular non-square block, there may be an advantage that a reference pixel used for the wide-angle prediction (the rightmost pixel 410 in FIG. 4d) is closer to most pixels of the block to be predicted and thus may provide better correlation with the pixels to be predicted than the primary reference sample in the acute angle direction (the third reference pixel 420 from the bottom in FIG. 4d).

When using traditional angles (directions from −32 to +32 in FIG. 3a), for example at most w+h "top and top-right" reference samples may be used, plus the one top-left corner sample. In the case of wide-angle modes more than that are needed. Samples beyond the top w+h samples may be checked for availability and use those as reference samples. Alternatively such "far-away" reference samples may be considered as unavailable and padded (copied) values may be used for them, by using the closest reference sample that has been marked as available.

Figure 5A:
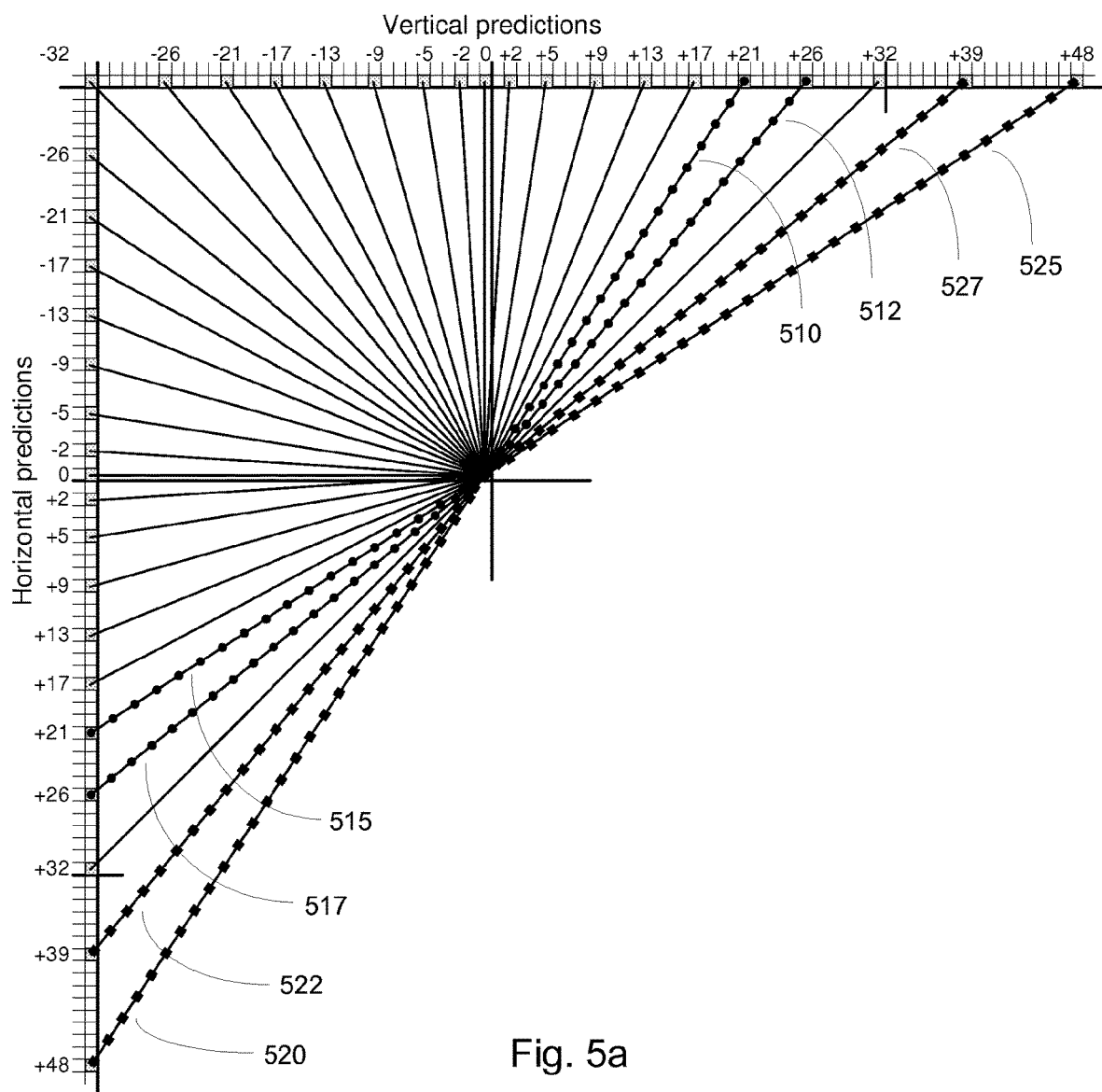
FIGS. 5a, 5b, 5c, 5d and 5e illustrate wide angle directional intra prediction modes.

FIG. 5a depicts a set of directional intra prediction modes (directions). Original modes 510, 512, 515, 517 having associated wide-angle modes 520, 522, 525, 527 (respectively) are marked with round dots and the corresponding wide-angle modes with square dots. Such primary mode and wide-angle mode may be understood to form so-called wide-angle directional intra prediction pairs, here the pairs being (510, 520), (512, 522), (515, 525) and (517, 527). The pairs may have an associated general directionality, e.g. indicated by the acute-angle mode, such as +21 for the pair (510, 520). Also the +45 degree horizontal and vertical modes (with +32 sample displacement listed in FIG. 5a) may be represented as a primary mode—wide-angle mode pair specifying the general directionality (of +32) and further which of the two directions to enable, instead of the traditional representation of two individual modes.

Figure 5B:
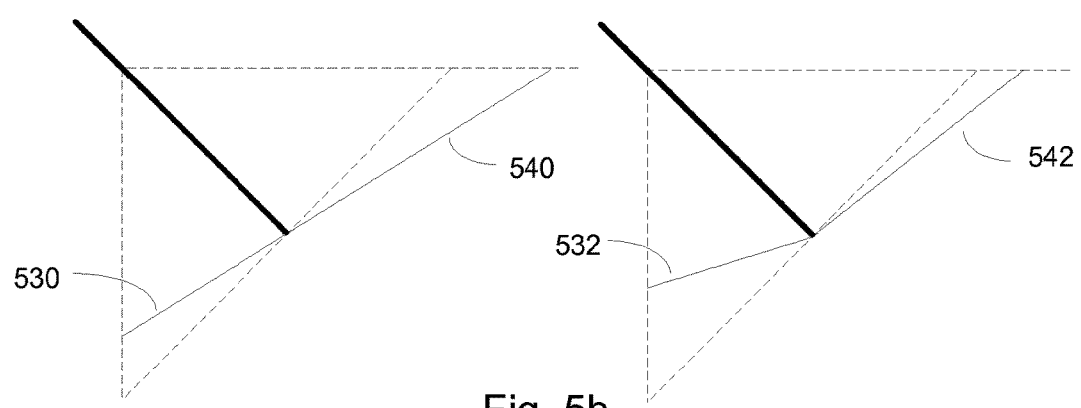

FIGS. 5b, 5c, 5d and 5e illustrate some examples of associated wide-angle modes. In FIG. 5b, a directly opposite "flipped" wide-angle mode 540 for a primary (acute-angle) mode 530 is shown on the left. The angle of the wide angle mode 540 with respect to the top-left direction can be obtained from the primary mode 530 by subtracting the primary mode angle from 180 degrees. That is, if the primary mode angle is α, where the angle α is acute, the angle of the wide-angle mode with respect to the top-left direction is 180°-α. As shown in FIG. 5b on the right, the wide-angle mode 542 may not be directly opposite to the corresponding primary narrow-angle (acute) mode 532, but it may instead be approximately opposite, or opposite, but not directly opposite. In other words, a wide-angle mode may be such that it has a direction that forms an obtuse angle with the top-left direction (emphasized direction in FIG. 5b), and is on the opposite side of the primary mode with respect to the top-left direction.

Figure 5C:
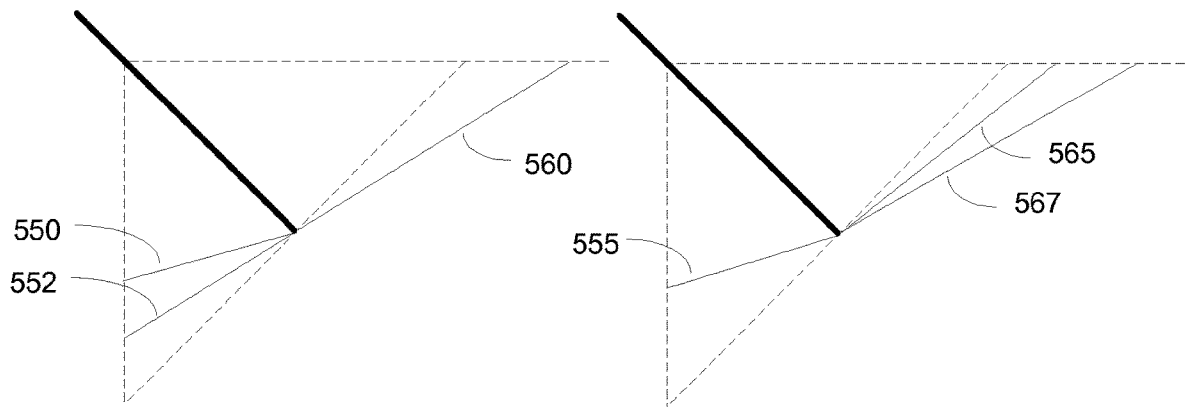

As FIG. 5c illustrates (left image), the correspondence between a primary (narrow-angle) mode and a wide-angle mode may be other than forming a pair. For example, there may be two primary modes (narrow-angle modes) 550, 552 that have the same associated wide-angle mode 560. This may improve coding efficiency by reducing the number of different modes. Also, this may allow to select reference pixels closer to the predicted block. Likewise, there may be more than one wide-angle modes 565, 567 associated with a primary narrow-angle mode 555. This may increase coding efficiency as there are fewer primary modes that have an associated wide-angle mode.

Figure 5D:
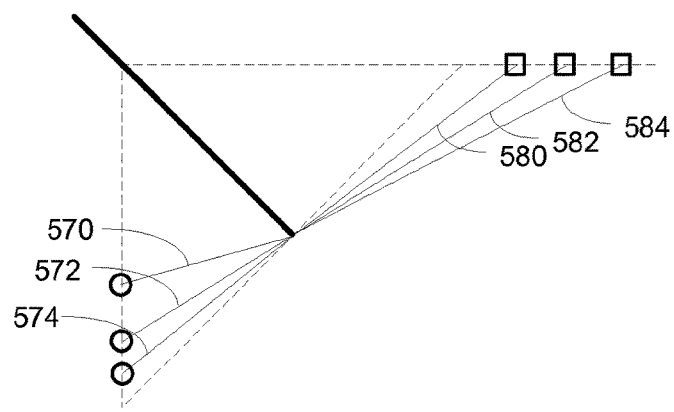

FIG. 5d illustrates the concept of directional prediction wide-angle mode set. The wide angle mode set has been marked with squares, and comprises a set of wide-angle modes 580, 582, 584. These wide-angle modes may be associated with primary modes 570, 572, 574, marked with circles. Such a wide-angle mode set may be communicated in the bitstream. There may be a number of wide-angle mode sets defined and communicated in the bitstream. The wide-angle mode set to be used for encoding and decoding may be communicated with a wide-angle mode set indicator in the bitstream. Such an indicator may be placed, for example, in the picture header or the slice header, or a parameter set referred to from a picture or a slice.

Figure 5E:
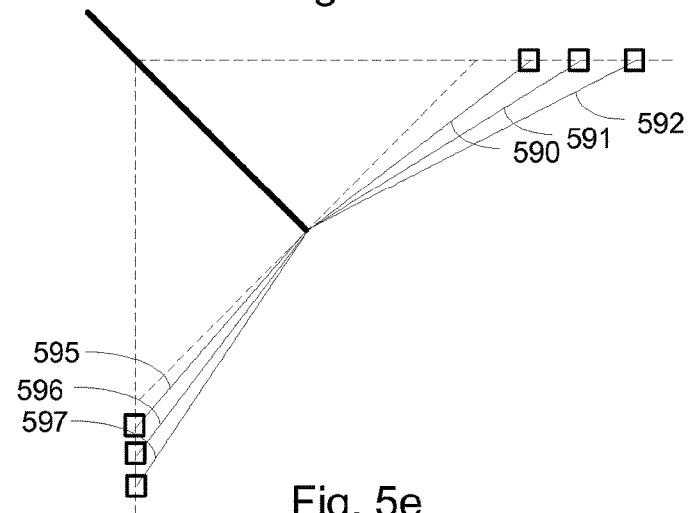

FIG. 5e illustrates that one or more wide-angle mode sets may be used. For example, the modes 590, 591 and 592 may be in one wide-angle mode set, and the modes 595, 596, 597 may be in another. In encoding and decoding, such mode sets may also be used so that the mode set to be used is communicated directly in the bitstream, and the mode from the mode set is communicated in the bitstream.

A video or image decoder or encoder operating according to the invention may include spatial intra prediction directions with angularity over the traditional limit of +45 degrees to the set of prediction modes. While this can benefit to some extent traditional square prediction blocks it is found to be especially useful for non-square rectangular prediction blocks. That is due to the finding that some of the traditional prediction directions, when applied to the direction of the narrower side of the block tend to have majority of the reference samples disconnected from the border of the prediction block. However, a textural structure with similar directionality can be generated by an approximate inverse direction (by "flipping" or rotating the prediction direction by exactly or roughly by 180 degrees). By performing that operation majority of the reference samples become closer neighbors for the prediction block and provide statistically better prediction, and as a result coding efficiency gains are observed.

The wide angle prediction modes with directionality over +45 degrees with respect to either directly horizontal or directly vertical direct predictions can be coded by traditional intra mode coding means. That is, those can be added to the list of available prediction modes, an individual mode number can be assigned to each of these modes and when the decoded intra prediction mode refers to a wide angle mode the intra prediction process performs sample prediction from indicated direction. In the case of non-square prediction blocks, this process can be advantageously modified and the shape of the block can be considered as part of the decoding process. One possibility to do this is to include wide angle modes with directionality over +45 degrees only for the main direction for which the block has its larger dimension. For example, if the width of the prediction block is 16 samples and the height of the prediction block is 4 samples, the set of directional intra prediction modes can be defined to include narrow angle horizontal modes with angularities from −45 to +45 degrees, narrow angle vertical modes with angularities from −45 to +45 degrees and one or more wide angle vertical modes with angularities larger than +45 degrees (e.g. as in FIG. 5e). The number and directionality of the wide angle modes may also depend on the shape of the block. For example, if the ratio of the width and height is 2:1 certain number of wide angle directions may be included in the list of available mode and if the ratio if 4:1 another number of wide angle directions may be included in the list. Similarly the shape of the prediction block may define how many of the narrow angle modes with directionality between −45 and +45 degrees are included in the list of available intra prediction modes for the block, for example so that the more elongated the block is, the more wide-angle modes are included. It has been noticed here that by selecting the wide-angle (obtuse) direction may provide a prediction that is more reliable than provided by the acute angle prediction direction in case of a non-square block to be predicted.

One possibility to indicate the wide angle modes is to allow the traditional set of narrow angle intra prediction directions with angularities ranging from −45 degrees to +45 degrees for all the block sizes and depending on the block shape decide which of the narrow angle modes have an additional "flip" wide angle mode associated with them (such as in FIG. 5d). In this way a decoder can first decode a narrow angle prediction mode that defines the general directionality of the block and if that mode indicates a mode with associated wide-angle mode it can also decode an additional identifier "use wide-angle mode instead of primary mode" defining should the mode be interpreted as a narrow angle traditional mode or a wide angle flip mode. This kind of an approach is convenient as the narrow angle mode can be used to predict modes of the consequent prediction modes, as it defines the directionality of the texture the sample prediction process generates for the block. In the case of simply adding the wide angle directions with angularity exceeding +45 degree to the list of prediction modes as independent modes the resulting list of modes would have paired modes generating the same directionality but with different reference samples. That could make predicting directionality of the following blocks work less reliably.

As an alternative implementation the number of intra prediction modes available for a prediction block can be kept constant, but the decoder can interpret the indicated mode number differently depending on the shape of the prediction block. For example, some of the directions associated with prediction modes can be "flipped" to exactly or roughly 180 degrees depending on the shape of the block (see FIG. 5b). For example, referring to FIG. 5a, horizontal narrow angle predictions with associated displacement parameters +21 and +26 can be reinterpreted as vertical wide angle modes with displacement parameters of +48 and +39, respectively, if the width of the prediction block is larger than the height of the prediction block (as it could be expected that vertical predictions operate better due to prediction block having smaller relative distance to its top reference samples compared to its left reference samples). Similarly the vertical narrow angle predictions with associated displacement parameters +21 and +26 can be reinterpreted as horizontal wide angle modes with displacement parameters of +48 and +39, respectively, if the width of the prediction block is smaller than the height of the prediction block. The selection of these prediction directions are provided as an example and in practice one can select different number of modes with different narrow angle and flipped wide angle displacement parameters as wide-angle candidates.

As an alternative implementation the number of intra prediction modes available for a prediction block can be kept constant, but the entropy coding and decoding of the modes can be altered based on the shape or dimensions of the prediction block. For example, different context may be used by the arithmetic decoder to decode the prediction directions of different main directionality. Decoder can first read from the bitstream an indication whether horizontal or vertical main direction is used and switch to different context modes based on the main prediction direction and shape of the block. Alternatively in the case of approaches using most probable mode prediction, that is having a syntax element defining if the selected prediction mode is among prioritized modes, the construction of the priority mode list can be done based on the shape of the block. E.g. a vertical candidate mode can be included in the set before or instead of a horizontal candidate if the prediction block's width is larger than its height and a horizontal mode can be included in the list before or instead of a vertical candidate if the block's width is smaller than its height.

In other words, the information on the block shape may influence how many wide-angle directional prediction modes are used, which wide-angle directional prediction modes are used, which sets of wide-angle directional prediction modes are used, what the probabilities of the different modes are, and so on. Such way of using the information on the block shape may increase coding efficiency, since not all of the information needs to be explicitly coded, or shorter code words can be assigned for the more probable parameter values.

The approach to select the most probable modes based on the block shape may be used with the traditional narrow-angle intra-picture directional prediction, as well.

The "flipped" wide angle displacement parameter may be calculated from displacement parameter of an original narrow angle mode by using the inverse of the original mode at defined accuracy (see FIG. 5b left panel). For example in the case of 1/32 sample accurate displacement parameters a wide angle displacement parameter dW can be calculated from the original narrow angle displacement parameter dN with integer arithmetic as:

$$\text{inverseAngle(dN)} = (256*32)/\text{dN}$$

$$\text{dW} = 32*\text{inverseAngle(dN)} >> 8$$

where >> denotes a bit-shift operation (this may correspond to the result of the computation 1024/dN, appropriately truncated or rounded, depending on the computational architecture). Defining the "flipped" wide-angle displacement parameter this way has the advantage of avoiding division operations with parameters potentially not powers of two in the final calculation of dW. In this way, intermediate values of inverseAngle(dN) can be pre-calculated and stored in a memory buffer to be used when dW needs to be evaluated by the encoder or the decoder. dW may be also defined in different ways. For example it does not need to have linear or inverse dependency of dN, but could be found heuristically and be set to equal values in encoder and corresponding decoder depending on the value of dN.

An alternative implementation may have multiple wide angle modes associated with a single narrow angle mode or more than one narrow angle mode associated with a single wide angle mode (see FIG. 5c). Encoder and decoder can also generate predictions by combining sample predictions of the narrow angle mode and the associated wide angle flip mode in order to create bi-predicted samples. This can be done for example by weighting the predicted samples based on their distance from reference samples or by other approaches. Also for the case or bi-prediction or more generally in the case of uni-prediction there can be offset indication for the wide angle mode in order to adjust that to match better the desired texture structures of the block.

Traditional −45 to +45 degree narrow angle prediction require reference samples that are maximum of block width plus block height away from the top-left corner of the prediction block (as illustrated in the FIGS. 2b and 2c). In the case of wide angle prediction exceeding +45 degrees, some reference samples further away may be needed. One possibility is to use padding (copying the value of closest available reference samples) to generate reference samples with distance further than block width +height from the top-left coordinate of the block. Another possibility would be to use already processed samples with similar availability conditions as used for the range of narrow angle reference samples.

In order to further enhance the quality of the predicted blocks filtering and other adjustment operations may be carried out before (e.g. for the reference samples) or after the sample prediction utilizing wide angle intra modes (e.g. filtering the sides or internal parts of the prediction block).

A video or image decoder may be configured to select between narrow angle directional intra prediction modes which have angularity between −45 degrees and +45 degree with respect to a main prediction direction and wide-angle modes that have angularity larger than +45 degrees with respect to a main prediction direction, the main prediction direction being either directly horizontal or directly vertical direction.

The availability of one or more of wide angle prediction modes with angularity larger than or equal to +45 degrees dependent on the shape of the prediction block.

A video or image decoder may decode a prediction mode identifier, check if the decoded mode has an associated "flip" mode (wide-angle mode) available, and based on that check decodes a second identifier determining if the original prediction direction or its inverse direction is to be used.

The original (primary) prediction direction may use primarily samples from first border of the block with a first prediction sample displacement parameter and the wide-angle prediction direction may use samples from second border of the block with a second prediction sample displacement parameter (see FIG. 3b), the first border of the block being different from the second border of the block and the first prediction sample displacement parameter being same or different from the second prediction sample displacement parameter.

The set of available intra prediction modes may depend on the shape of the prediction block (that is, the width and height of the prediction block in the case of rectangular block structures).

A directional intra prediction mode with a certain identifier may be interpreted to have a first angularity if width of the block is larger than the height of the block and a second angularity if the width of the block is smaller than the height of the block, the first angularity being different from the second angularity.

There may be a first intra prediction mode having an angularity between −45 degrees and +45 degrees with respect to either directly horizontal or directly vertical main direction, which has a corresponding wide-angle mode with angularity of at least +45 degrees with respect to the other main direction than the main direction of the first intra prediction mode.

The context selection for entropy decoding of an intra prediction mode may depend on the shape of the block. For example, a binary arithmetic decoder may use different expected probabilities for mode identifiers depending on whether the block is a square one: assume roughly equal probability for up and left directions for square blocks, but bias the direction of the longer edge if the block is not square. In practice, this improves the coding efficiency because shorter code words are used for more probable symbols to be coded.

The encoder and decoder may identify a set of most probable modes for the prediction block based on the shape of the block and encode/decode an identifier indicating if the selected mode is one of the most probable modes.

The encoder and decoder may identify a set of most probable modes for the prediction block based on the shape of the block and encode/decode an identifier indicating which of said most probable modes is the one selected for the block.

The proposed method and devices may improve the accuracy of directional intra prediction. It also provides an efficient signaling mechanism for the case when we have directional prediction modes with opposite directionalities in the list of available prediction modes.

In FIG. 6a, a flow chart of a decoding method is shown. In phase 610, reference pixels may be formed from a received bitstream for intra-picture directional prediction. In phase 612, pixel values may be predicted to obtain a predicted block. The prediction may be performed using with wide-angle prediction direction, as has been described earlier. In phase 614, the obtained wide-angle intra-predicted block may be used in decoding an image block from the bitstream. A prediction error signal may be decoded from the bitstream and added to the predicted image block to obtain a decoded image block.

In FIG. 6b, a flow chart of an encoding method is shown. In phase 616, reference pixels may be formed from image data to be encoded. These reference pixels may be used in the following intra-picture directional prediction. In phase 618, pixel values may be predicted to obtain a predicted block with wide-angle prediction direction, as has been described earlier. In phase 619, the wide-angle intra-predicted block may be used in encoding an image block into a bitstream. The predicted block may be subtracted from the image block to be encoded to obtain a prediction error signal. The error signal and parameters and indicators for intra-picture directional prediction may be encoded into the bitstream.

Figure 6C:
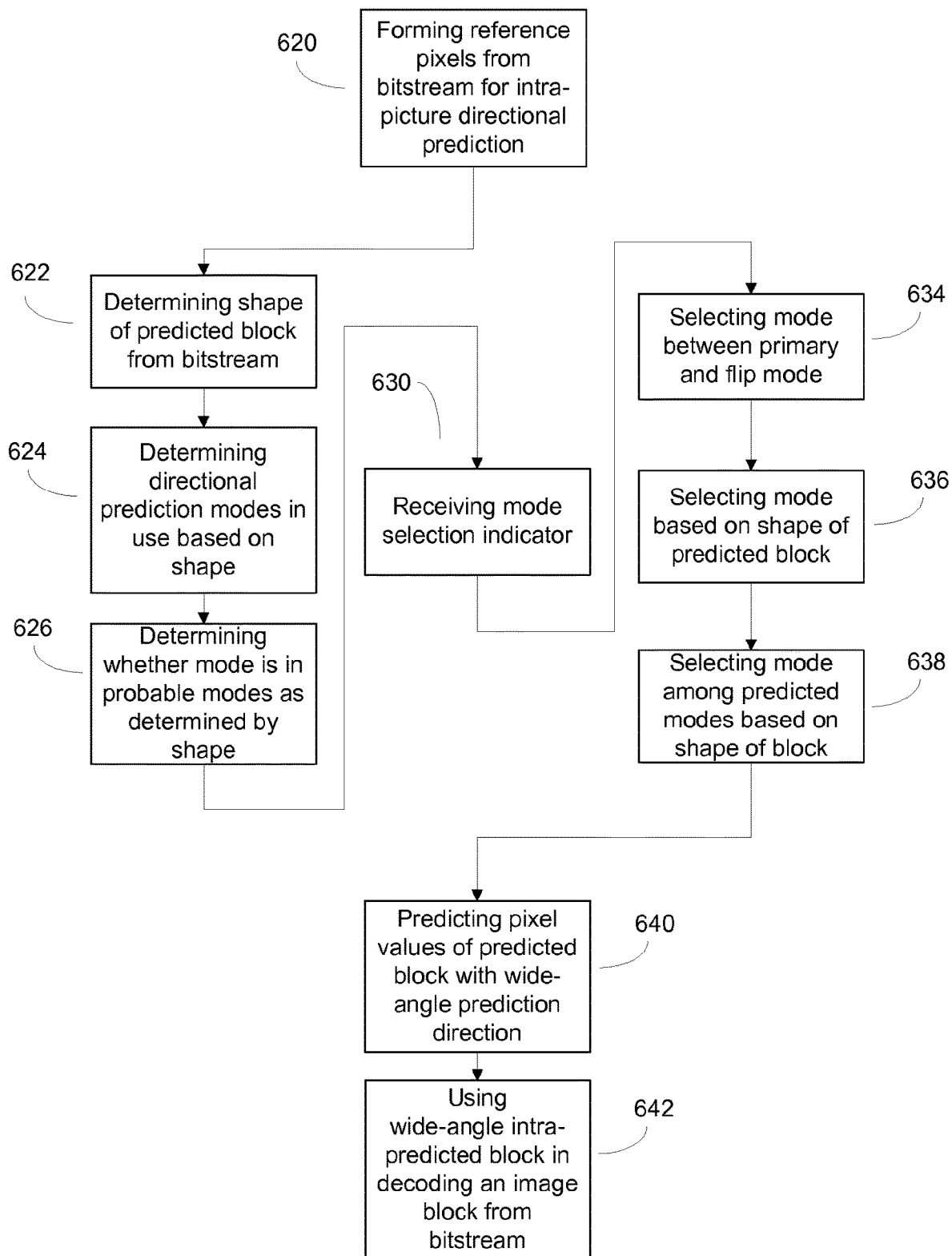

In FIG. 6c, a flow chart of a decoding method is shown. In phase 620, reference pixels may be formed from a received bitstream for intra-picture directional prediction. In phase 622, the shape of the block to be predicted may be determined from the bitstream. In phase 624, the directional prediction modes that are in use based on the shape may be determined. In phase 626, it may be determined whether the used directional prediction mode is in the probable modes as determined by shape. In phase 630, a mode selection indicator may be received from the bitstream. In phase 634, the mode to be used may be selected between a primary and a flip mode of the primary mode. In phase 636, the mode to be used may be selected based on the shape of the block. In phase 638, the mode to be used may be selected among predicted modes based on the shape of the block. In phase 640, pixel values may be predicted to obtain a predicted block. The prediction may be performed using with wide-angle prediction direction, as has been described earlier. In phase 642, the obtained wide-angle intra-predicted block may be used in decoding an image block from the bitstream. A prediction error signal may be decoded from the bitstream and added to the predicted image block to obtain a decoded image block. In the method of FIG. 6c, the phases may be in different order than drawn in the figure. Individual phases may be carried out or may be omitted. Different phases may be combined, or different phases may be treated as alternatives.

Figure 6D:
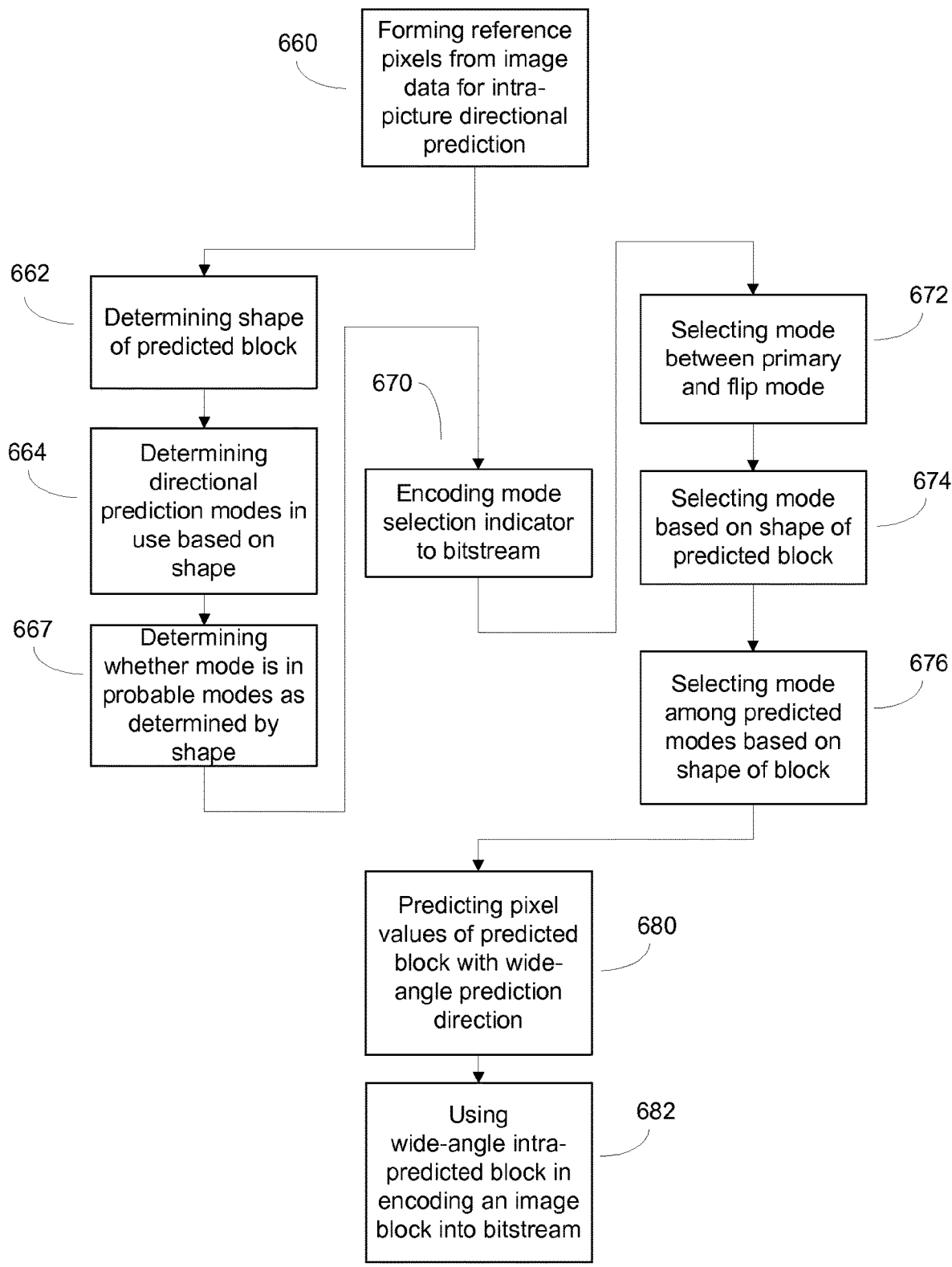

In FIG. 6d, a flow chart of an encoding method is shown. In phase 660, reference pixels may be formed from image data to be encoded. These reference pixels may be used in the following intra-picture directional prediction. In phase 662, the shape of the block to be predicted may be determined so that it can be used in the subsequent directional prediction. In phase 664, the directional prediction modes that are in use based on the shape may be determined. In phase 667, it may be determined whether the used directional prediction mode is in the probable modes as determined by shape. In phase 670, a mode selection indicator may be encoded into the bitstream. In phase 672, the mode to be used may be selected between a primary and a flip mode of the primary mode. In phase 674, the mode to be used may be selected based on the shape of the block. In phase 676, the mode to be used may be selected among predicted modes based on the shape of the block. In phase 680, pixel values may be predicted to obtain a predicted block with wide-angle prediction direction, as has been described earlier. In phase 682, the wide-angle intra-predicted block may be used in encoding an image block into a bitstream. The predicted block may be subtracted from the image block to be encoded to obtain a prediction error signal. The error signal and parameters and indicators for intra-picture directional prediction may be encoded into the bitstream. In the method of FIG. 6d, the phases may be in different order than drawn in the figure. Individual phases may be carried out or may be omitted. Different phases may be combined, or different phases may be treated as alternatives.

In the following, numbered examples are given.

1. A method, comprising:
   receiving a bitstream comprising encoded image data,
   forming from said bitstream in a computer memory a set of reference pixels having reference pixel values for intra-picture directional prediction,
   predicting a pixel value in a predicted image block by intra-picture directional prediction by using values of one or more selected reference pixels in forming a predicted pixel value, wherein the selected reference pixels are selected from a prediction direction with respect to the predicted pixel, and said prediction direction being a wide-angle prediction direction that forms an obtuse angle with top-left direction of said predicted pixel,
   repeating the pixel prediction for a number of pixels to form a predicted image block,
   using said predicted image block in decoding an image block from said bitstream to obtain a decoded image block.

2. The method according to example 1, wherein said predicted image block has a shape, comprising:
   determining said shape from said bitstream,
   determining directional prediction modes to be used in said intra-picture directional prediction based on said shape,
   in predicting said pixel value, selecting said prediction direction from said directional prediction modes.

3. The method according to example 1 or 2, wherein said predicted image block has a shape, the method comprising:
   determining said shape from said bitstream,
   determining prediction modes to be used in said intra-picture directional prediction,
   determining probable prediction modes based on said shape,
   decoding an indicator from said bitstream indicating whether said prediction direction is one of said probable prediction modes, and
   selecting said prediction direction from said probable prediction modes.

4. The method according to example 1, 2 or 3, comprising:
   determining directional prediction modes to be used in said intra-picture directional prediction,
   decoding a direction indicator from said bitstream,
   selecting said prediction direction for said predicting said pixel value from a primary direction and a wide-angle direction, said primary direction and a wide-angle direction being associated with said direction indicator.

5. The method according to example 4, comprising:
   decoding a prediction direction selection indicator from said bitstream, and
   selecting said prediction direction for said predicting said pixel value from said normal direction and said wide-angle direction using said prediction direction selection indicator.

6. The method according to example 4, wherein said predicted image block has a shape, comprising:

determining said shape from said bitstream,
selecting said prediction direction for said predicting said pixel value from a primary direction and a wide-angle direction based on said shape.

7. The method according to any of the examples 4 to 6, wherein said primary direction is associated with said wide-angle direction such that said primary direction and said wide-angle direction are essentially opposite directions.

8. The method according to any of the examples 4 to 6, wherein said primary direction is associated with said wide-angle direction such that said primary direction and said wide-angle direction are other than essentially opposite directions and that said primary direction and said wide-angle direction are on opposite sides of said top-left direction.

9. The method according to any of the examples 4 to 8, wherein there are more than one wide angle directions associated with one primary direction, or more than one primary direction has the same associated wide angle direction, or both.

10. The method according to any of the examples 1 to 9, wherein said predicted image block has a shape, the method comprising:
determining said shape from said bitstream,
determining prediction modes to be used in said intra-picture directional prediction,
decoding a direction indicator from said bitstream,
forming a predicted prediction direction for said predicting said pixel value between a normal direction and a wide-angle direction using said shape, said normal direction and a wide-angle direction being associated with said direction indicator, and
selecting said prediction direction based on said predicted prediction direction.

11. A method, comprising:
receiving image data to be encoded,
forming from said image data in a computer memory a set of reference pixels having reference pixel values for intra-picture directional prediction,
predicting a pixel value in a predicted image block by intra-picture directional prediction by using values of one or more selected reference pixels in forming a predicted pixel value, wherein the selected reference pixels are selected from a prediction direction with respect to the predicted pixel, and said prediction direction being a wide-angle prediction direction that forms an obtuse angle with top-left direction of said predicted pixel,
repeating the pixel prediction for a number of pixels to form a predicted image block,
using said predicted image block in encoding an image block into a bitstream.

12. The method according to example 11, wherein said predicted image block has a shape, comprising:
determining directional prediction modes to be used in said intra-picture directional prediction based on said shape,
in predicting said pixel value, selecting said prediction direction from said directional prediction modes.

13. The method according to example 11 or 12, wherein said predicted image block has a shape, the method comprising:
determining prediction modes to be used in said intra-picture directional prediction,
determining probable prediction modes based on said shape,
selecting said prediction direction from said probable prediction modes, and
encoding an indicator into said bitstream indicating whether said prediction direction is one of said probable prediction modes.

14. The method according to example 11, 12 or 13, comprising:
determining directional prediction modes to be used in said intra-picture directional prediction,
selecting said prediction direction for said predicting said pixel value from a primary direction and a wide-angle direction, said primary direction and a wide-angle direction being associated with said direction indicator, and
encoding a direction indicator into said bitstream.

15. The method according to example 14, comprising:
selecting said prediction direction for said predicting said pixel value from said normal direction and said wide-angle direction using said prediction direction selection indicator, and
encoding a prediction direction selection indicator into said bitstream.

16. The method according to example 14, wherein said decoded image block has a shape, comprising:
selecting said prediction direction for said predicting said pixel value from a primary direction and a wide-angle direction based on said shape.

17. The method according to any of the examples 14 to 16, wherein said primary direction is associated with said wide-angle direction such that said primary direction and said wide-angle direction are essentially opposite directions.

18. The method according to any of the examples 14 to 16, wherein said primary direction is associated with said wide-angle direction such that said primary direction and said wide-angle direction are other than essentially opposite directions and that said primary direction and said wide-angle direction are on opposite sides of said top-left direction.

19. The method according to any of the examples 14 to 18, wherein there are more than one wide angle directions associated with one primary direction, or more than one primary direction has the same associated wide angle direction, or both.

20. The method according to any of the examples 11 to 19, wherein said decoded image block has a shape, the method comprising:
determining prediction modes to be used in said intra-picture directional prediction,
forming a predicted prediction direction for said predicting said pixel value between a normal direction and a wide-angle direction using said shape, said normal direction and a wide-angle direction being associated with a direction indicator, and
selecting said prediction direction based on said predicted prediction direction, and
encoding a direction indicator into said bitstream.

21. An apparatus comprising at least one processor, memory including computer program code, the memory and the computer program code configured to, with the at least one processor, cause the apparatus to perform at least the following:
receive a bitstream comprising encoded image data,
form from said bitstream in a computer memory a set of reference pixels having reference pixel values for intra-picture directional prediction,
predict a pixel value in a predicted image block by intra-picture directional prediction by using values of one or more selected reference pixels in forming a
predicted pixel value, wherein the selected reference
pixels are selected from a prediction direction with
respect to the predicted pixel, and said prediction
direction being a wide-angle prediction direction that
forms an obtuse angle with top-left direction of said
predicted pixel, repeat the pixel prediction for a number of pixels to form
a predicted image block, use said predicted image block in decoding an image
block from said bitstream to obtain a decoded image
block.

22. The apparatus according to example 21, wherein said predicted image block has a shape, the apparatus comprising computer program code to cause the apparatus to:

determine said shape from said bitstream, determine directional prediction modes to be used in said intra-picture directional prediction based on said shape, in prediction of said pixel value, select said prediction direction from said directional prediction modes.

23. The apparatus according to example 21 or 22, wherein said predicted image block has a shape, the apparatus comprising computer program code to cause the apparatus to:

determine said shape from said bitstream, determine prediction modes to be used in said intra-picture directional prediction, determine probable prediction modes based on said shape, decode an indicator from said bitstream indicating whether said prediction direction is one of said probable prediction modes, and select said prediction direction from said probable prediction modes.

24. The apparatus according to example 21, 22 or 23, comprising computer program code to cause the apparatus to:

determine directional prediction modes to be used in said intra-picture directional prediction, decode a direction indicator from said bitstream, select said prediction direction for said prediction of said pixel value from a primary direction and a wide-angle direction, said primary direction and a wide-angle direction being associated with said direction indicator.

25. The apparatus according to example 24, comprising computer program code to cause the apparatus to:

decode a prediction direction selection indicator from said bitstream, and select said prediction direction for said predicting said pixel value from said normal direction and said wide-angle direction using said prediction direction selection indicator.

26. The apparatus according to example 24, wherein said predicted image block has a shape, the apparatus comprising computer program code to cause the apparatus to:

determine said shape from said bitstream, select said prediction direction for said predicting said pixel value from a primary direction and a wide-angle direction based on said shape.

27. The apparatus according to any of the examples 24 to 26, wherein said primary direction is associated with said wide-angle direction such that said primary direction and said wide-angle direction are essentially opposite directions.

28. The apparatus according to any of the examples 24 to 26, wherein said primary direction is associated with said wide-angle direction such that said primary direction and said wide-angle direction are other than essentially opposite directions and that said primary direction and said wide-angle direction are on opposite sides of said top-left direction.

29. The apparatus according to any of the examples 24 to 28, wherein there are more than one wide angle directions associated with one primary direction, or more than one primary direction has the same associated wide angle direction, or both.

30. The apparatus according to any of the examples 21 to 29, wherein said predicted image block has a shape, the apparatus comprising computer program code to cause the apparatus to:

determine prediction modes to be used in said intra-picture directional prediction, form a predicted prediction direction for said predicting said pixel value between a normal direction and a wide-angle direction using said shape, said normal direction and a wide-angle direction being associated with a direction indicator, select said prediction direction based on said predicted prediction direction, and encode said direction indicator into said bitstream.

31. A system comprising at least one processor, memory including computer program code, the memory and the computer program code configured to, with the at least one processor, cause the system to perform at least the following:

receive a bitstream comprising encoded image data, form from said bitstream in a computer memory a set of reference pixels having reference pixel values for intra-picture directional prediction, predict a pixel value in a predicted image block by intra-picture directional prediction by using values of one or more selected reference pixels in forming a predicted pixel value, wherein the selected reference pixels are selected from a prediction direction with respect to the predicted pixel, and said prediction direction being a wide-angle prediction direction that forms an obtuse angle with top-left direction of said predicted pixel, repeat the pixel prediction for a number of pixels to form a predicted image block, use said predicted image block in decoding an image block from said bitstream to obtain a decoded image block.

32. A system comprising at least one processor, memory including computer program code, the memory and the computer program code configured to, with the at least one processor, cause the system to perform at least the following:

receive image data to be encoded, form from said image data in a computer memory a set of reference pixels having reference pixel values for intra-picture directional prediction, predict a pixel value in a predicted image block by intra-picture directional prediction by using values of one or more selected reference pixels in forming a predicted pixel value, wherein the selected reference pixels are selected from a prediction direction with respect to the predicted pixel, and said prediction direction being a wide-angle prediction direction that forms an obtuse angle with top-left direction of said predicted pixel, repeat the pixel prediction for a number of pixels to form a predicted image block, use said predicted image block in encoding an image block into a bitstream.

33. An apparatus, comprising:

means for receiving a bitstream comprising encoded image data, means for forming from said bitstream in a computer memory a set of reference pixels having reference pixel values for intra-picture directional prediction, means for predicting a pixel value in a predicted image block by intra-picture directional prediction by using values of one or more selected reference pixels in forming a predicted pixel value, wherein the selected reference pixels are selected from a prediction direction with respect to the predicted pixel, and said prediction direction being a wide-angle prediction direction that forms an obtuse angle with top-left direction of said predicted pixel, means for repeating the pixel prediction for a number of pixels to form a predicted image block, means for using said predicted image block in decoding an image block from said bitstream to obtain a decoded image block.

34. An apparatus according to example 33, wherein said predicted image block has a shape, comprising:

means for determining said shape from said bitstream, means for determining directional prediction modes to be used in said intra-picture directional prediction based on said shape, means for, in predicting said pixel value, selecting said prediction direction from said directional prediction modes.

35. The apparatus according to example 33 or 34, wherein said predicted image block has a shape, the apparatus comprising:

means for determining said shape from said bitstream, means for determining prediction modes to be used in said intra-picture directional prediction, means for determining probable prediction modes based on said shape, means for decoding an indicator from said bitstream indicating whether said prediction direction is one of said probable prediction modes, and means for selecting said prediction direction from said probable prediction modes.

36. The apparatus according to example 33, 34 or 35, comprising:

means for determining directional prediction modes to be used in said intra-picture directional prediction, means for decoding a direction indicator from said bitstream, means for selecting said prediction direction for said predicting said pixel value from a primary direction and a wide-angle direction, said primary direction and a wide-angle direction being associated with said direction indicator.

37. The apparatus according to example 36, comprising:
means for decoding a prediction direction selection indicator from said bitstream, and means for selecting said prediction direction for said predicting said pixel value from said normal direction and said wide-angle direction using said prediction direction selection indicator.

38. The apparatus according to example 36, wherein said predicted image block has a shape, comprising:

means for determining said shape from said bitstream, means for selecting said prediction direction for said predicting said pixel value from a primary direction and a wide-angle direction based on said shape.

39. The apparatus according to any of the examples 36 to 38, wherein said primary direction is associated with said wide-angle direction such that said primary direction and said wide-angle direction are essentially opposite directions.

40. The apparatus according to any of the examples 36 to 38, wherein said primary direction is associated with said wide-angle direction such that said primary direction and said wide-angle direction are other than essentially opposite directions and that said primary direction and said wide-angle direction are on opposite sides of said top-left direction.

41. The apparatus according to any of the examples 36 to 40, wherein there are more than one wide angle directions associated with one primary direction, or more than one primary direction has the same associated wide angle direction, or both.

42. The apparatus according to any of the examples 33 to 41, wherein said predicted image block has a shape, the apparatus comprising:

means for determining said shape from said bitstream, means for determining prediction modes to be used in said intra-picture directional prediction, means for decoding a direction indicator from said bitstream, means for forming a predicted prediction direction for said predicting said pixel value between a normal direction and a wide-angle direction using said shape, said normal direction and a wide-angle direction being associated with said direction indicator, and means for selecting said prediction direction based on said predicted prediction direction.

43. An apparatus, comprising:
means for receiving image data to be encoded,
means for forming from said image data in a computer memory a set of reference pixels having reference pixel values for intra-picture directional prediction, means for predicting a pixel value in a predicted image block by intra-picture directional prediction by using values of one or more selected reference pixels in forming a predicted pixel value, wherein the selected reference pixels are selected from a prediction direction with respect to the predicted pixel, and said prediction direction being a wide-angle prediction direction that forms an obtuse angle with top-left direction of said predicted pixel, means for repeating the pixel prediction for a number of pixels to form a predicted image block, means for using said predicted image block in encoding an image block into a bitstream.

44. The apparatus according to example 43, wherein said predicted image block has a shape, comprising:

means for determining directional prediction modes to be used in said intra-picture directional prediction based on said shape, means for, in predicting said pixel value, selecting said prediction direction from said directional prediction modes.

45. The apparatus according to example 43 or 44, wherein said predicted image block has a shape, the apparatus comprising:

means for determining prediction modes to be used in said intra-picture directional prediction, means for determining probable prediction modes based on said shape, means for selecting said prediction direction from said probable prediction modes, and means for encoding an indicator into said bitstream indicating whether said prediction direction is one of said probable prediction modes.

46. The apparatus according to example 43, 44 or 45, comprising:
   means for determining directional prediction modes to be used in said intra-picture directional prediction,
   means for selecting said prediction direction for said predicting said pixel value from a primary direction and a wide-angle direction, said primary direction and a wide-angle direction being associated with said direction indicator, and
   means for encoding a direction indicator into said bitstream.

47. The apparatus according to example 46, comprising:
   means for selecting said prediction direction for said predicting said pixel value from said normal direction and said wide-angle direction using said prediction direction selection indicator, and
   means for encoding a prediction direction selection indicator into said bitstream.

48. The apparatus according to example 46, wherein said decoded image block has a shape, comprising:
   means for selecting said prediction direction for said predicting said pixel value from a primary direction and a wide-angle direction based on said shape.

49. The apparatus according to any of the examples 46 to 48, wherein said primary direction is associated with said wide-angle direction such that said primary direction and said wide-angle direction are essentially opposite directions.

50. The apparatus according to any of the examples 46 to 48, wherein said primary direction is associated with said wide-angle direction such that said primary direction and said wide-angle direction are other than essentially opposite directions and that said primary direction and said wide-angle direction are on opposite sides of said top-left direction.

51. The apparatus according to any of the examples 46 to 50, wherein there are more than one wide angle directions associated with one primary direction, or more than one primary direction has the same associated wide angle direction, or both.

52. The apparatus according to any of the examples 43 to 51, wherein said decoded image block has a shape, the apparatus comprising:
   means for determining prediction modes to be used in said intra-picture directional prediction,
   means for forming a predicted prediction direction for said predicting said pixel value between a normal direction and a wide-angle direction using said shape, said normal direction and a wide-angle direction being associated with a direction indicator, and
   means for selecting said prediction direction based on said predicted prediction direction, and
   means for encoding a direction indicator into said bitstream.

53. A bitstream signal embodied on a non-transitory computer-readable medium, the signal being arranged to, when decoded on a decoder, to cause the decoder to decode image data from said bitstream signal, the signal comprising a coded prediction error signal having been formed by using intra-picture directional prediction, wherein predicted pixel values have been formed in a predicted image block by intra-picture directional prediction by using values of one or more selected reference pixels in forming a predicted a pixel value, wherein the selected reference pixels have been selected from a prediction direction with respect to the predicted pixel, and said prediction direction being a wide-angle prediction direction that forms an obtuse angle with top-left direction of said predicted pixel, the bitstream signal arranged to cause the decoder to select the prediction direction to be a wide-angle prediction direction for decoding of the bitstream.

54. A bitstream signal embodied on a non-transitory computer-readable medium, the signal being arranged to, when decoded on a decoder, to cause the decoder to decode image data from said bitstream signal, the signal comprising information for determining a shape of an image block to be decoded, said decoding employing intra-picture directional prediction using a prediction direction, probable prediction modes being associated with said shape, and said bitstream comprising an indicator indicating whether said prediction direction is one of said probable prediction modes associated with said shape to cause the decoder to select the prediction direction for decoding of the bitstream.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method, comprising:
   receiving a bitstream comprising encoded image data;
   determining from the bitstream an intra-prediction mode for an image block;
   determining from the bitstream a width and a height of the image block;
   determining a displacement parameter for directional intra prediction by interpreting the intra-prediction mode, wherein the interpreting comprises:
      comparing the width and the height of the image block;
      if the width of the block is greater than the height of the block, interpreting at least one horizontal intra-prediction mode with a first displacement parameter as a vertical intra prediction mode with a second displacement parameter, wherein the second displacement parameter is larger than the first displacement parameter; and
      if the width of the block is smaller than the height of the block, interpreting at least one vertical intra-prediction mode with a third displacement parameter as a horizontal intra prediction mode with a fourth displacement parameter, wherein the fourth displacement parameter is larger than the third displacement parameter;
   predicting a pixel value in a predicted image block using the determined displacement parameter;
   repeating the pixel value prediction for a plurality of pixels to form a predicted image block; and
   using said predicted image block in decoding the image block from said bitstream to obtain a decoded image block.

2. The method according to claim 1, further comprising, in an instance the width of the image block is larger than the height of the image block, selecting a vertical wide angle intra-prediction direction with a displacement parameter corresponding to a directionality over +45 degrees with respect to a directly vertical direction.

3. The method according to claim 1, further comprising, in an instance the height of the image block is larger than the width of the image block, selecting a horizontal wide angle intra-prediction direction with a displacement parameter corresponding to a directionality over +45 degrees with respect to a directly horizontal direction.

4. The method according to claim 1, further comprising:
determining a plurality of intra-prediction modes; and
determining a respective displacement parameter for intra-prediction, for a respective intra-prediction mode from the plurality of intra-prediction modes, by interpreting the intra-prediction mode depending on the width and the height of the image block, and
wherein the plurality of intra-prediction modes is larger for a more elongated image block and smaller for a less elongated image block.

5. A method, comprising:
receiving a bitstream comprising image data to be encoded;
determining from the bitstream an intra-prediction mode for an image block;
determining from the bitstream a width and a height of the image block;
determining a displacement parameter for directional intra prediction by interpreting the intra-prediction mode, wherein the interpreting comprises:
comparing the width and the height of the image block;
if the width of the block is greater than the height of the block, interpreting at least one horizontal intra-prediction mode with a first displacement parameter as a vertical intra prediction mode with a second displacement parameter, wherein the second displacement parameter is larger than the first displacement parameter; and
if the width of the block is smaller than the height of the block, interpreting at least one vertical intra-prediction mode with a third displacement parameter as a horizontal intra prediction mode with a fourth displacement parameter, wherein the fourth displacement parameter is larger than the third displacement parameter;
predicting a pixel value in a predicted image block using the determined displacement parameter;
repeating the pixel value prediction for a plurality of pixels to form a predicted image block; and
using said predicted image block in encoding the image block from the bitstream to obtain an encoded image block.

6. The method according to claim 5, further comprising:
in an instance the width of the image block is larger than the height of the image block, selecting a vertical wide angle intra-prediction direction with a displacement parameter corresponding to a directionality over +45 degrees with respect to a directly vertical direction; and
in an instance the height of the image block is larger than the width of the image block, selecting a horizontal wide angle intra-prediction direction with a displacement parameter corresponding to a directionality over +45 degrees with respect to a directly horizontal direction.

7. An apparatus comprising at least one processor, and memory including computer program code, the memory and the computer program code configured to, with the at least one processor, cause the apparatus to perform at least the following:
receive a bitstream comprising encoded image data;
determine from the bitstream an intra-prediction mode for an image block;
determine from the bitstream a width and a height of the image block;
determine a displacement parameter for directional intra prediction by interpreting the intra-prediction mode, wherein the interpreting comprises:
comparing the width and the height of the image block;
if the width of the block is greater than the height of the block, interpreting at least one horizontal intra-prediction mode with a first displacement parameter as a vertical intra prediction mode with a second displacement parameter, wherein the second displacement parameter is larger than the first displacement parameter; and
if the width of the block is smaller than the height of the block, interpreting at least one vertical intra-prediction mode with a third displacement parameter as a horizontal intra prediction mode with a fourth displacement parameter, wherein the fourth displacement parameter is larger than the third displacement parameter;
predict a pixel value in a predicted image block using the determined displacement parameter;
repeat the pixel value prediction for a plurality of pixels to form a predicted image block; and
use said predicted image block in decoding the image block from said bitstream to obtain a decoded image block.

8. The apparatus according to claim 7, further caused to perform, in an instance the width of the image block is larger than the height of the image block, selecting a vertical wide angle intra-prediction direction with a displacement parameter corresponding to a directionality over +45 degrees with respect to a directly vertical direction.

9. The apparatus according to claim 7, further caused to perform, in an instance the height of the image block is larger than the width of the image block, selecting a horizontal wide angle intra-prediction direction with a displacement parameter corresponding to a directionality over +45 degrees with respect to a directly horizontal direction.

10. The apparatus according to claim 7, further caused to perform:
determine a plurality of intra-prediction modes; and
determine a respective displacement parameter for intra-prediction, for a respective intra-prediction mode from the plurality of intra-prediction modes, by interpreting the intra-prediction mode depending on the width and the height of the image block, and
wherein the plurality of intra-prediction modes is larger for a more elongated image block and smaller for a less elongated image block.

11. An apparatus comprising at least one processor, and memory including computer program code, the memory and the computer program code configured to, with the at least one processor, cause the apparatus to perform at least the following:
receive a bitstream comprising image data to be encoded;
determine from the bitstream an intra-prediction mode for an image block;
determine from the bitstream a width and a height of the image block;
determine a displacement parameter for directional intra prediction by interpreting the intra-prediction mode, wherein the interpreting comprises:
comparing the width and the height of the image block;

if the width of the block is greater than the height of the block, interpreting at least one horizontal intra-prediction mode with a first displacement parameter as a vertical intra prediction mode with a second displacement parameter, wherein the second displacement parameter is larger than the first displacement parameter; and if the width of the block is smaller than the height of the block, interpreting at least one vertical intra-prediction mode with a third displacement parameter as a horizontal intra prediction mode with a fourth displacement parameter, wherein the fourth displacement parameter is larger than the third displacement parameter;

predict a pixel value in a predicted image block using the determined displacement parameter;

repeat the pixel value prediction for a plurality of pixels to form a predicted image block; and use said predicted image block in encoding the image block from the bitstream to obtain an encoded image block.

12. The apparatus according to claim 11, wherein the apparatus is further caused to perform:

in an instance the width of the image block is larger than the height of the image block, selecting a vertical wide angle intra-prediction direction with a displacement parameter corresponding to a directionality over +45 degrees with respect to a directly vertical direction; and in an instance the height of the image block is larger than the width of the image block, selecting a horizontal wide angle intra-prediction direction with a displacement parameter corresponding to a directionality over +45 degrees with respect to a directly horizontal direction.

13. A non-transitory computer readable medium storing computer program code configured, upon execution, to:

receive a bitstream comprising encoded image data;

determine from the bitstream an intra-prediction mode for an image block;

determine from the bitstream a width and a height of the image block;

determine an intra prediction direction a displacement parameter for directional intra prediction by interpreting the intra-prediction mode, wherein the interpreting comprises:

comparing the width and the height of the image block;

if the width of the block is greater than the height of the block, interpreting at least one horizontal intra-prediction mode with a first displacement parameter as a vertical intra prediction mode with a second displacement parameter, wherein the second displacement parameter is larger than the first displacement parameter; and if the width of the block is smaller than the height of the block, interpreting at least one vertical intra-prediction mode with a third displacement parameter as a horizontal intra prediction mode with a fourth displacement parameter, wherein the fourth displacement parameter is larger than the third displacement parameter;

predict a pixel value in a predicted image block using the determined displacement parameter;

repeat the pixel value prediction for a plurality of pixels to form a predicted image block; and use said predicted image block in decoding the image block from said bitstream to obtain a decoded image block.

14. The method according to claim 5, further comprising:

determining a plurality of intra-prediction modes; and determining a respective displacement parameter for intra-prediction, for a respective intra-prediction mode from the plurality of intra-prediction modes, by interpreting the intra-prediction mode depending on the width and the height of the image block, and wherein the plurality of intra-prediction modes is larger for a more elongated image block and smaller for a less elongated image block.

* * * * *

UNITED STATES PATENT AND TRADEMARK OFFICE
CERTIFICATE OF CORRECTION

PATENT NO. : 11,044,467 B2
APPLICATION NO. : 16/473785
DATED : June 22, 2021
INVENTOR(S) : Lainema Page 1 of 1

It is certified that error appears in the above-identified patent and that said Letters Patent is hereby corrected as shown below:

In the Claims

Column 32,
Lines 3 and 4, "determine an intra prediction direction a displacement parameter" should read
--determine a displacement parameter--.

Signed and Sealed this
Twelfth Day of July, 2022

Katherine Kelly Vidal
*Director of the United States Patent and Trademark Office*